United States Patent [19]

Jackson et al.

[11] 4,393,498

[45] Jul. 12, 1983

[54] METHOD AND APPARATUS FOR TESTING SYSTEMS THAT COMMUNICATE OVER DIGITAL BUSES BY TRANSMITTING AND RECEIVING SIGNALS IN THE FORM OF STANDARDIZED MULTI-BIT BINARY ENCODED WORDS

[75] Inventors: Tee-Squant-Nee Jackson, Seattle; Paul M. Vernon, Redmond; David A. Schoen, Bothell, all of Wash.

[73] Assignee: The Boeing Company, Seattle, Wash.

[21] Appl. No.: 227,371

[22] Filed: Jan. 22, 1981

[51] Int. Cl.³ .......................................... G06F 11/00
[52] U.S. Cl. ...................................... 371/20; 371/29
[58] Field of Search ............................. 371/20, 27, 29; 364/200

[56] References Cited

U.S. PATENT DOCUMENTS

| | | | |
|---|---|---|---|
| 3,575,589 | 4/1971 | Neema et al. | 364/200 |
| 3,920,972 | 11/1975 | Corwin, Jr. et al. | 318/574 X |
| 3,920,973 | 11/1975 | Avellar et al. | 340/146.2 X |
| 3,928,830 | 12/1975 | Bellamy et al. | 371/29 X |
| 3,975,622 | 9/1976 | Horn et al. | 364/900 X |
| 3,987,420 | 10/1976 | Badagnani | 364/200 |
| 4,001,807 | 1/1977 | Dallimonti | 340/324 A |
| 4,064,394 | 11/1977 | Allen | 364/200 X |
| 4,074,358 | 2/1978 | Caputo et al. | 364/514 |
| 4,104,725 | 8/1978 | Rose et al. | 364/487 |
| 4,109,309 | 8/1978 | Johnstone et al. | 364/514 X |
| 4,115,858 | 9/1978 | Kaufman | 364/474 |
| 4,155,116 | 5/1979 | Tawfit et al. | 364/579 X |
| 4,162,531 | 7/1979 | Rode et al. | 364/571 |
| 4,168,527 | 9/1979 | Winkler | 364/580 |
| 4,179,922 | 12/1979 | Bouverie et al. | 73/116 |
| 4,194,113 | 3/1980 | Fulks et al. | 371/20 |
| 4,204,253 | 5/1980 | van den Hanenberg et al. | 364/200 |
| 4,308,615 | 12/1981 | Koegel et al. | 371/20 |

OTHER PUBLICATIONS

Eugene, "Microprogramming Helps Check LSI RAMS and Logic", *Electronics*, vol. 53, No. 26, Dec. 4, 1980, pp. 137–141.

W. A. Farnbach, "System Testing with a Logic State Analyzer", Microprocessor Basics, pp. 51–55.

Nagel and van den Berg, "Programming Communications Subsystem Having Controller Incorporating Microprocessor", IBM, 12/78, pp. 2633–2645.

*Primary Examiner*—David H. Malzahn
*Attorney, Agent, or Firm*—Christensen, O'Connor, Johnson & Kindness

[57] ABSTRACT

An apparatus is disclosed for testing line replaceable units (LRUs) of an avionics system in which the various units of the system exchange information by means of transmitting and/or receiving digital communication words, each word having a predetermined, standardized format. In a transmit test mode of the apparatus, the information content of a test word is formulated in either engineering or binary form by using a keyboard to create the word manually, or by retrieving a preprogrammed word or sequence of dynamically changing words from a plug-in programmable read only memory (PROM). Once formulated and stored, the communication word is repetitively transmitted, at selected word and bit transfer rates, from one or more output ports provided on the test set and applied, by a jumper connection, to a data communication bus that, in turn, is connected to one or more avionic LRUs. A CRT on the control panel of the test set simultaneously displays the information content of the transmit word, both in engineering and binary form. In a receive mode, a signal receiving port is coupled to a communication bus associated with one or more avionics LRUs for monitoring preselected communication words that are exchanged between the LRUs connected to that bus. The received word or words are decoded by the test set and displayed both in engineering and binary form on the CRT. The transmit and receive modes may be used concurrently so that a given LRU or groups of LRUs can be stimulated by one or more transmit words, and the word responses of such LRUs monitored. In a further mode, called receive-all, an abbreviated form (LABEL) of the engineering notation of each word present on a monitored data bus is displayed on the CRT, allowing the user to select certain words from among the displayed LABELs for full-word processing in the above-mentioned receive mode.

8 Claims, 30 Drawing Figures

TRANSMIT TEST/STIMULUS MODE

RECEIVE TEST/MONITOR MODE

| ALTITUDE | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| FUNCTION | LABEL (OCTAL 203) | | | | | | | | RESERVED (SDI) | | SPARE | | | | | | DATA FIELD (13/071.0 FEET) | | | | | | | | | | + SIGN FOR BNR | SIGN/STATUS MATRIX (SSM) | (NL) | PARITY (P) (EV.) |
| BIT NO. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
| EXAMPLE | 1 | 0 | 0 | 0 | 0 | 0 | 1 | 0 | 0 | 0 | 1 | 1 | 1 | 1 | 1 | 1 | 1 | 1 | 1 | 1 | 1 | 1 | 1 | 1 | 1 | 1 | 1 | 0 | 0 | 1 | 1 | 0 |

ENGINE
PARAMETER
SELECT DISPLAY
PAGE

```
SELECT APPROPRIATE
   ENGINE PARAMETER
         1. EPR
         2. NI
```

Fig.8b.

TRANSMIT (Tx)
PAGE AND
PAGE SELECT
DISPLAY

```
TX LAB SDI DATA      SSM P RT B
1
2
3
TX BINARY
P                         LABEL
B1
B2
B3
SELECT DISPLAY (TX, RX, RX ALL)
_
```

Fig.8c.

Tx PAGE WITH
"LINE" SELECTION
PROMPT

```
TX LAB SDI DATA      SSM P RT B
1
2
3
TX BINARY
P                         LABEL
B1
B2
B3
LINE ?
_
```

Fig. 8d.
Tx PAGE AFTER WORD ENTRY FOR LINE 1

```
TX LAB SDI DATA     SSM P RT B
1H 203 00 +131071.8 NL    25 0
2
3
TX BINARY
P                         LABEL
B1
0110111111111111111100011000001
B2
B3
LINE ?
—
```

Fig. 8e.
RECEIVE (Rx) PAGE AND PAGE SELECT DISPLAY

```
RX LAB SDI DATA     SSM P
1
2
3
RX BINARY
P                         LABEL
W1
W2
W3
SELECT DISPLAY (TX, RX, RX ALL)
```

Fig. 8f.
Rx PAGE WITH "LINE" SELECTION PROMPT

```
RX LAB SDI DATA     SSM P
1
2
3
RX BINARY
P                         LABEL
W1
W2
W3
LINE ?
—
```

Fig. 8g.

Rx PAGE AFTER ENTRY OF OCTAL LABEL AND SDI BITS

```
RX LAB SDI DATA      SSM P
1  203 XX
2
3
RX BINARY
P
W1                   LABEL
W2
W3
LINE
—
```

Fig. 8h.

Rx PAGE DISPLAYING ENGINEERING AND BINARY FORMATS

```
RX LAB  SDI  DATA      SSM P
1  203  XX  +131071.0  NL
2
3
RX BINARY
P
W1                     LABEL
01101111111111111111110001100001
W2
W3
```

Fig. 8i.

RECEIVE ALL (Rx ALL) DISPLAY LISTING ALL RECEIVED LABELS

```
   203    033    015    016

SELECT DISPLAY (Tx, Rx RXALL)
—
```

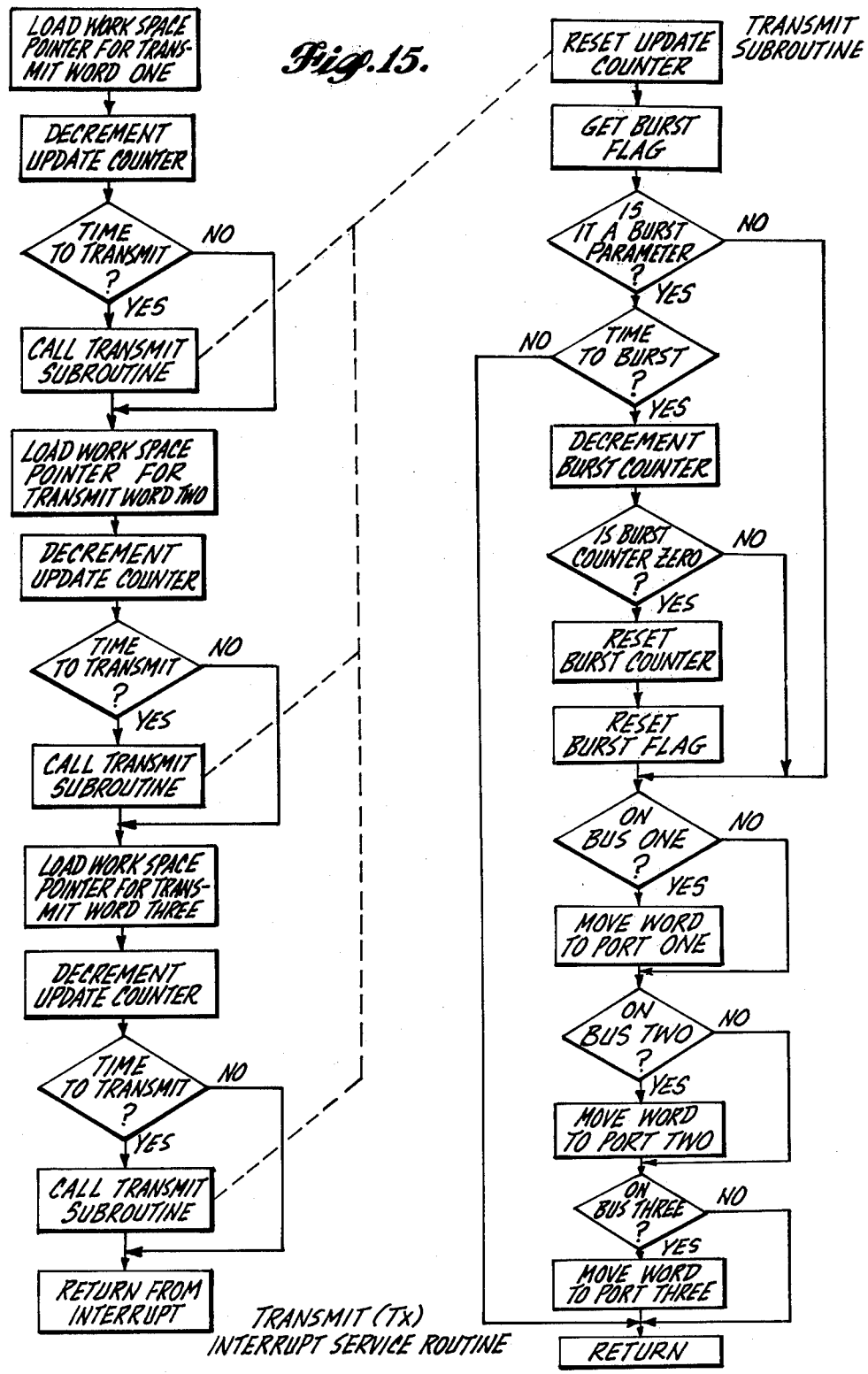

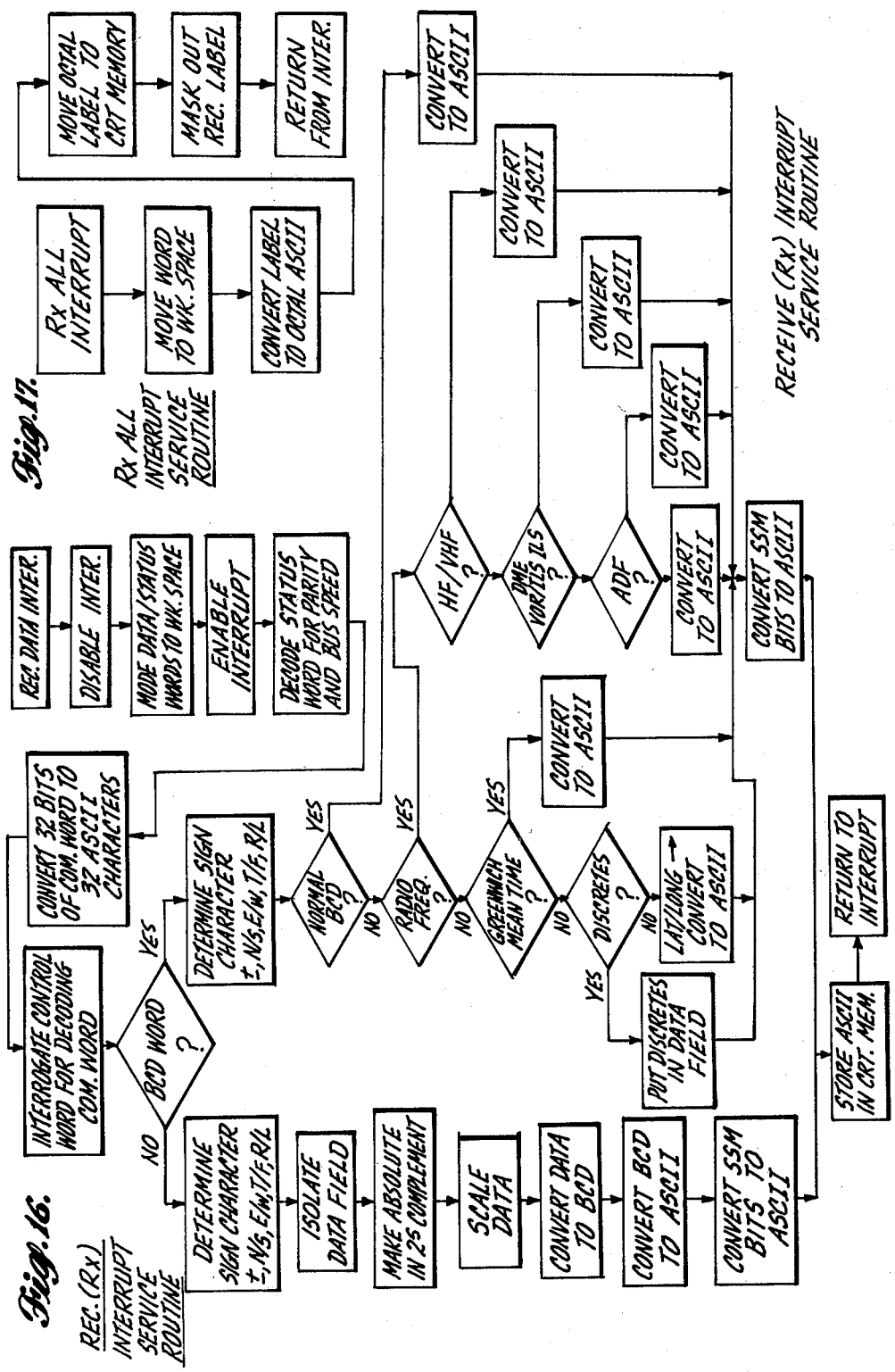

METHOD AND APPARATUS FOR TESTING SYSTEMS THAT COMMUNICATE OVER DIGITAL BUSES BY TRANSMITTING AND RECEIVING SIGNALS IN THE FORM OF STANDARDIZED MULTI-BIT BINARY ENCODED WORDS

BACKGROUND OF THE INVENTION

The invention disclosed herein pertains to digital test equipment for verifying the proper operation of digital subsystems that communicate over digital information buses by means of standardized, multi-bit communication words transmitted and/or received over such buses.

Although a test set constructed in accordance with the invention disclosed below has broad application in the testing of digital information exchange systems, it is particularly useful in connection with digital avionics systems and subsystems that are comprised of numerous line replaceable units (LRUs). Each LRU in the avionics system constitutes a replaceable electronics component, and each of these components communicates with others in the overall avionics system by means of transmitting and receiving digital information formatted in standardized multi-bit words that are recognized by the built-in intelligence of each LRU. For example, an LRU may sense the altitude of the aircraft and electronically formulate a digital multi-bit serial word that among other things includes a binary representation of the engineering value of the altitude, whereafter the thusly formulated digital word is transmitted to another LRU which, for example, might be a digital readout on the instrument panel of the cockpit. There, the word is decoded and displayed on the readout in decimal notation or in some other pilot readable form.

While the LRU altimeter is but one example of a line replaceable subsystem, it will be appreciated that the actual avionics system in large sophisticated aircraft of today involve hundreds to thousands of widely varying LRUs which are interconnected by the digital buses of the integrated system to form a complex intelligence system that assists in piloting the aircraft. Because of the complexities of the avionics system when considered as a whole, the aircraft industry has taken steps to standardize the multi-bit digital words that are transmitted and received by the various LRUs so as to facilitate the interchangeability of and maintenance of such components.

One particular aspect of this standardization is to specify that the information transmitted and/or received by at least certain of the LRUs of a typical avionics system shall be in the form of serial, multi-bit communication words, wherein each word includes a data field comprising the engineering or numeric content of the information, a label constituting another subgroup of bits and defining the function of the word (e.g., altitude) and certain other bit groups and single bits representing secondary information. An example of such a standardized digital information word is specified in a publication prepared by Aeronautical Radio, Inc. of Annapolis, Md., entitled "Mark 33 Digital Information Transfer System (DITS) Specification No. 429-3," published Dec. 15, 1979, the contents of which is incorporated herein by reference. The communication word described in Specification 429-3, and known in the industry as the ARINC 429 word, is comprised of 32 bits in a standardized format which, as explained more fully hereinafter, can be used to represent over 300 different functions or parameters generated and/or received by commonly employed LRUs of an avionics system. Altitude was mentioned above and other examples are latitude/longitude, ground speed, magnetic heading, wind speed, runway heading, vertical speed, frequency of radio navigational signals, etc. The information carried in the various 32 bit communication words flows from one LRU port to one or more other LRU ports over a single twisted and preferably shielded pair of wires in which only unidirectional, serial flow of the digital word or words is permitted. Thus, two LRUs that require bidirectional communication will be coupled by at least two separate sets of twisted wire pairs.

Because of the above-mentioned complexities of avionic systems, when the individual LRUs are connected and operating as an integrated system, it is a tedious and formidable task to verify that each LRU is operating properly, and that the various subsystems of two or more coupled LRUs are properly interacting. To a somewhat lesser extent, the testing of stand alone LRUs (disconnected from the system) presents similar difficulties. Available test equipment, including known digital pattern generators and associated displays, have been found lacking in one or more respects in generating, receiving and displaying the test signal information in a format that lends itself to rapid verification of valid operation, and troubleshooting.

Accordingly, it is an object of the invention to provide a test set for use in checking out and troubleshooting LRU based avionics systems having digital communication buses that interconnect the system's LRUs, and that is capable of formulating, transmitting and receiving the inter-LRU digital communication words, and is further capable of displaying the represented communication words in both engineering and binary notation. Still another object of the invention is to provide such a test set in which the generation, transmission and reception of the digital signals is formatted in a standardized multi-bit word that forms the basis of communication between the various LRUs.

Additionally, it is an object of the invention to provide a test set having the above capabilities together with a plurality of individually controllable transmit channels so that two or more communication words can be separately and, if needed, concurrently transmitted for testing the interaction of two or more LRUs in a simulated subsystem.

A further object is to provide a display of the transmitted and received communication words in a concurrent manner so that degradation or other disturbance of the signals that represent the word can be quickly and easily isolated to facilitate troubleshooting.

Also, it is an object to provide such a test set having a monitoring capability for rapidly identifying one or more particular communication words that are present on a communication bus and are received by the test set.

A further object is to provide such a test set having the capability of concurrently transmitting a communication word on one bus and at the same time receiving a communication word on another bus so that an LRU or a subsystem of LRUs can be stimulated by an artificially generated and transmitted word, and the response to such stimulation monitored in the form of the received communication word.

One additional object is to provide a test set having the foregoing capabilities in conjunction with a keyboard entry that permits the formulation of a test transmit word in either engineering or binary form.

SUMMARY

These and other objects, features and advantages of the invention are achieved by providing an apparatus for testing subsystems which communicate by transmitting and/or receiving multi-bit communication words that have a predetermined format. The test apparatus comprises a display device for presenting alphanumeric images in response to display control signals that are generated by test signal processing means, characterized below, functioning in response to the transmit and receive communication words. The test signal processing means includes transmit word processing means for selecting the contents of one or more transmit words in the form of either operator readable engineering notation, or in binary notation. Also provided is receive word processing means for selecting one or more coded labels that identify certain corresponding communication words, and cooperating therewith is a receiving circuit means for accepting and storing the identified receive word or words as they are received in the form of machine readable bit states.

A first conversion processor accepts and converts the contents of the transmit word or words to a binary form, when they have been formulated and inputted in engineering notation. A coacting, second conversion processor accepts and converts the contents of the transmit word or words into operator readable engineering notation when such words have been formulated and entered in binary notation, and a like conversion processor transforms the received word or words from machine readable binary notation to user readable engineering form.

A transmit circuit means responsive to the transmit word or words generated by the above-described means serves to apply these transmit words, and cooperating display control processor means generates display control signals that cause the display device to visually present the transmit word or words both in the form of bit states (such as represented by ones and zeroes) and for comparison in the form of readable engineering notation. Similarly, the display control processor causes the display device to present the contents of the chosen receive word or words both in the form of bit states (represented by ones and zeroes) and for comparison, in the form of readable engineering notation.

Another aspect of the invention is the provision of an operating mode in which the labels (word identifiers) of all communication words present on a monitored bus are processed and displayed so that the user can then use the above-described receive processor to receive and analyze the complete binary and engineering notations of such words present on the bus.

In addition to the foregoing principal elements of the invention, the preferred form of the test apparatus includes: in the above-mentioned transmit circuit means, a plurality of transmit ports for concurrently transmitting one or more formulated transmit words from differnt ports; a burst mode in the above-described transmit circuit means for selectively transmitting a chosen word a selected and limited number of times in rapid succession, i.e., as a burst, for testing certain navigational LRUs that are initialized in this fashion; means for selecting desired word and bit transmission rates, and parity as part of the transmit processing; and means for detecting parity errors in conjunction with the receive word processing.

To provide a complete disclosure of the invention, reference is made to the appended drawings and following description of one particular and preferred embodiment.

BRIEF DESCRIPTION OF THE DRAWINGS

FIG. 7 is a chart of one example of a standardized communication word transmitted and/or received by tested subsystems and components of an avionics system, showing the conversion between the multi-bit binary word form and the same communication in engineering notation.

FIGS. 8a through 8i depict the format and sequence of the transmit and receive communications of the test set as they are displayed on the CRT screen of the test set shown in FIG. 1.

FIG. 15 is a detailed flowchart of a transmit interrupt service routine shown generally in FIG. 9.

FIG. 16 is a detailed flowchart of a receive interrupt service routine shown generally in FIG. 9.

FIG. 17 is a detailed flow diagram of a receive-all interrupt service routine shown generally in FIG. 9.

DETAILED DESCRIPTION

Figure 1:
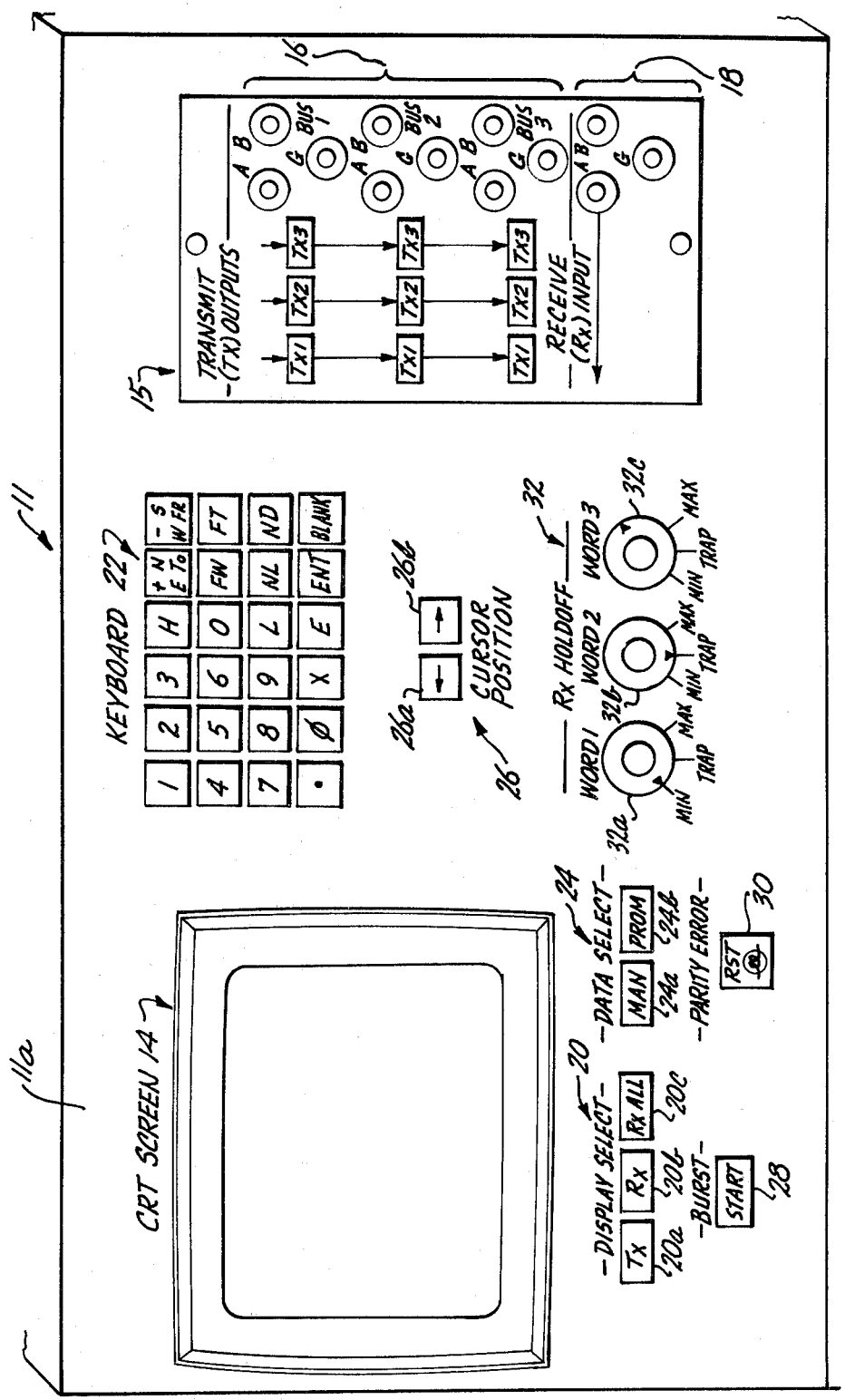
FIG. 1 is a front elevational view of the control panel of the test set constructed in accordance with the preferred embodiment of the invention.

With reference to FIG. 1, the invention is disclosed in the form of a test set 11 including a control panel 11a, providing an operator-to-equipment interface for use in verifying the proper operating status of, and troubleshooting malfunctions of, individual components and cofunctioning subsystems of LRUs (line replaceable units) of an avionics system. In such a system, the LRUs, for example an altimeter unit or air speed sensor, communicate with other line replaceable units or systems of such units by transmitting and/or receiving communications in the form of a standardized, multi-bit digital word. While test set 11 is adaptable to a wide variety of related testing environments, it will be disclosed in a form suitable for testing one particular type of communication word, specified by the Mark 33 Digital Information Transfer System published by Aeronautical Radio, Inc. of Annapolis, Md., as ARINC Specification 429-4, Aug. 1, 1980, and referred to herein as the ARINC 429 word. This word is comprised of 32 bits grouped according to the following functions: parity, sign/status matrix, data field, source/destination indicator and label (see FIG. 7). In the case of a transmit word produced by an altimeter LRU, the data field of the word would include a field of bits representing the altitude in a binary form, and the label would similarly include a series of bits representing a numeric indicator of the function or parameter of the word, namely altitude.

Test set 11 includes a number of operator controls and input switches (described below) which enable the user, in conjunction with prompts displayed on a CRT screen 14 to formulate and cause the transmission of one or more transmit digital words at a plurality of transmit ports indicated at 16; and to separately or concurrently receive a selected communication word or words via a receive port indicated at 18 on control panel 11a. The transmit and receive ports 16 and 18, respectively, are mounted on a plug-in module 15 and are adapted to be connected to digital communication buses that in turn are interconnected with the various LRU components and subsystems of the avionics system so as to artifically stimulate, in the transmit mode, a response by such LRUs, and to monitor, in the receive mode, such artificially stimulated response (or the normal unstimulated communications) of the LRUs.

The operating modes of test set 11 and the resulting responses at transmit output ports 16 and receive input port 18 are established by various operator controls including a set of three juxtaposed display select switches indicated at 20 including a transmit function (Tx) switch 20a, a receive function (Rx) switch 20b and a receive-all function (Rx-All) switch 20c which cause CRT screen 14 to generate successive display pages including a transmit page, a receive page and a receive-all page, respectively. As each such function page is displayed, the operator is prompted to make the necessary keyboard entries and other control switch changes to input the desired transmit word or words and to identify those receive words that are to be accepted for monitoring. In both the transmit and receive modes, the communication word or words are converted from the source notation, engineering to binary, and vice versa, as needed to make available both forms of the transmit and receive words to the CRT controller for concurrent display thereof on screen 14.

Control panel 11a includes a keyboard entry indicated at 22 which is provided in this embodiment by a 6-by-4 key pad including decimal digits Ø through 9 plus a decimal point, together with a group of functon switches identified as "X" (representing a blank character or digit), "H" (high bit rate), "O" (odd parity), "L" (low bit rate), "E" (even parity), "+," "N," "E" and "to" (representing the sign conditions of positive, north, east, and to depending upon the parameter designated by the particular communication word), "FW" (failure warning), "NL" (normal operation), "ENT" (enter), "—," "S," "W" and "Fr" (representing the sign conditions of minus, south, west and from), "FT" (function test), "ND" (no computed data), and a blank (for blanking screen character) switch. By placing display 14 in one of the above-mentioned display select modes of transmit or receive, keyboard 22 is used to enter the desired transmit communication word or words in either engineering notation or binary notation (including pack discretes), or to identify a particular receive words or words for monitoring. The receive-all mode is a special function allowing the user to receive and display the lables (only) of all communication words present on a bus to which the receive port 18 is connected.

A set of two data select function switches indicated at 24 serve to select the source of the input communication word either from manual entry through keyboard 22 when a manual select switch 24a is operated, or from an erasable programmable read only memory (EPROM), mounted behind ports 16 and 18 in plug-in module 15, and active when PROM switch 24b is operated. Both Tx page parameter and PROM mode parameter are sent when the PROM mode is selected.

When the chosen communication word is to be entered through keyboard 22 in response to manual data select switch 24a, an entered word may be modified in a character-by-character or bit-by-bit manner by using the left and right cursor position switches 26a and 26b in a conventional manner.

To provide a special suboperating condition of the transmit mode, a burst start switch 28 is provided under the bank of display select switches 20 to trigger the start of a burst transmission during which a chosen transmit word is repetitively issued from any combination of the transmit output ports 16 a preselected number of times in a repetitive "burst", rather than the normal transmit mode in which the repetition of the word is continuous rather than limited. As described more fully herein, the burst mode is selected by a coded keyboard entry.

A composite function switch and indicator light module 30 includes a lamp for visually representing a parity error condition in the receive communication word, and the switch function of module 30 provides an override for resetting the parity error detection processor after the error has been acknowledged.

During the receive mode, a set of three RX hold-off controls indicated at 32 are provided for adjusting the sampling rate of one or more of three different concurrently monitored communication words for slowing down the displayed content of each of these words on display 14, even though the content of the words in real time is changing more rapidly than the operator can visually discern. Thus, for three concurrently monitored receive words numbers 1, 2 and 3, separate hold-off controls 32a, 32b and 32c provide for varying the respective hold-off rates from minimum to maximum and also provide a trap condition when rotated to the maximum counterclockwise position for capturing the contents of the communication word in the form of its initial reception.

Transmit output ports 16 include a set of three output buses identified as bus 1, bus 2 and bus 3, each having a group of three terminals marked A, B and G, the latter representing ground. The transmit words on buses 1, 2 and 3 of ports 16 send a communication word in serial bit form, in which the individual bits are represented by differential voltages between terminals A and B. A +10 volt represents a binary one, and a −10 volt represents a binary zero. For each output bus numbers 1, 2 and 3, a separate set of three transmit enabling switches Tx1, Tx2 and Tx3 are provided so that three different transmit words can be formulated by using keyboard 22 or retrieved from a plug-in PROM in response to switch 24b. Such transmit words are then individually or concurrently dispatched from output ports 16 by selective operation of the banks of transmit switches Tx1, Tx2 and Tx3 as described more fully hereinafter under the section entitled Transmit Page Display.

The receive input port 18 is similar to the transmit ports in that a set of three terminals are provided as indicated by terminal A, terminal B and the ground terminal G. The receive words are communicated to port 18 in the same serial bit format as described above for the transmission of words from ports 16.

Figure 2:
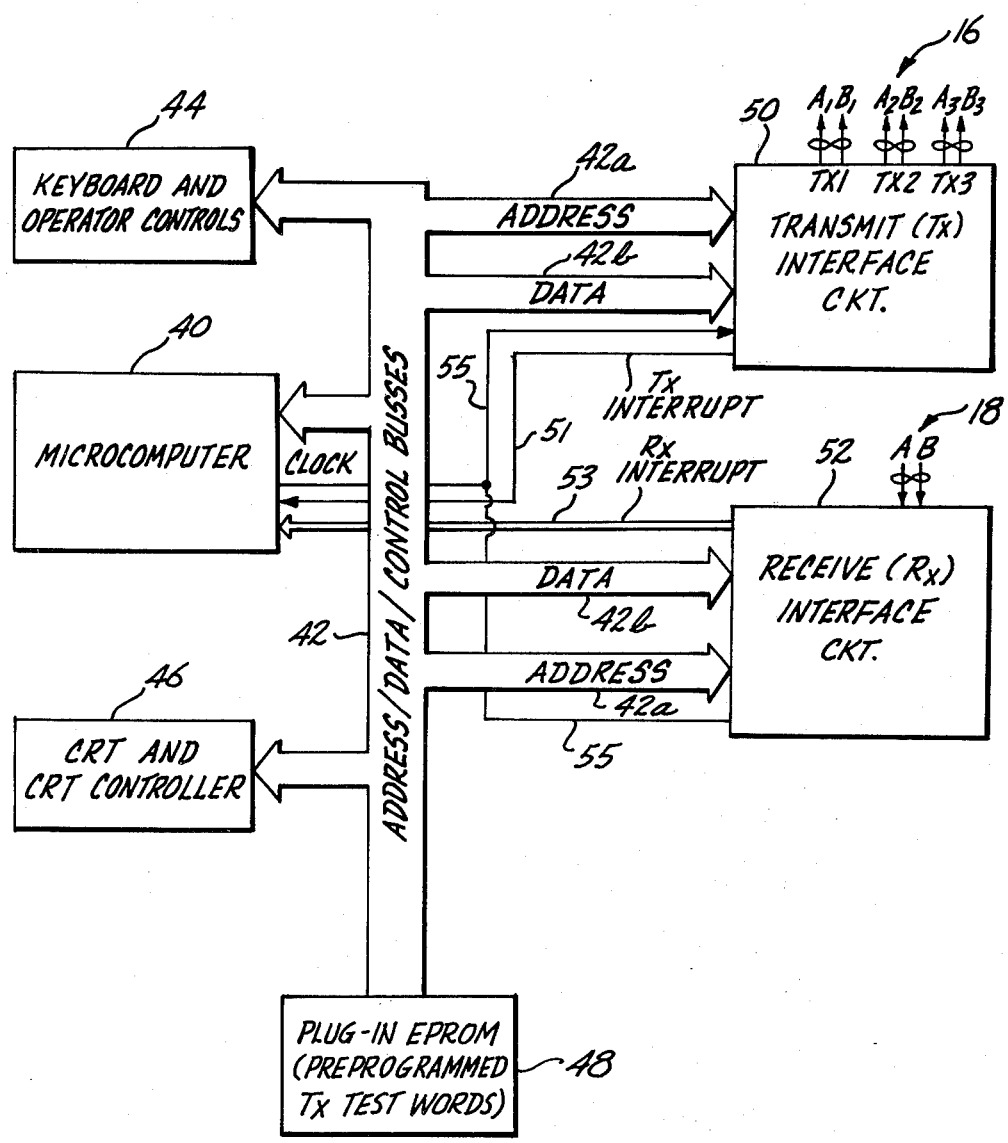
FIG. 2 is an overall block diagram of the circuit components of the test set shown in FIG. 1.

The operating states of CRT screen 14, transmit output ports 16, receive port 18 are controlled by a microprocessor based microcomputer 40, which as shown in FIG. 2 is interconnected via address/data/control buses 42 to the input and output devices and associated interface circuits that enable test set 11 to interact with the operator via control panel 11a, and to communicate with the data buses that interconnect the LRUs of an avionics system. Thus, as shown in FIG. 2, microcomputer 40 is joined by buses 42 to a block entitled keyboard and operator controls 44 which with reference to FIG. 1 collectively incorporates display select switches 20, keyboard 22, data select switches 24, cursor position switches 26, and burst start switch 28. For example, keyboard 22 communicates in a conventional fashion with the various registers and memory of microcomputer 40.

Similarly, address/data and control buses 42 are also connected to a block entitled CRT and CRT controller 46 which includes the CRT display screen 14 shown on control panel 11a of FIG. 1. Controller 46 formats data processed and made available by microcomputer 40, for presenting on the screen 14 in the manner described in greater detail hereinafter. The communication between microcomputer 40 and the keyboard and operator controls 44 and the CRT and CRT controller 46 via address/data/control buses 42 entails conventional and well known data processing devices and functions and further detail concerning this aspect of test set 11 are omitted. Similarly, a plug-in erasable programmable read only memory (EPROM) 48 is connected to the microcomputer 40 again over address/data/control buses 42 in a well known fashion, for providing in response to the data select PROM switch 24b on control panel 11a (FIG. 1), preprogrammed test words that are used by microcomputer 40, in lieu of manually entered data via keyboard 22, for formulating one or more transmit words. The construction and operation of EPROMs and the detailed manner in which such devices communicate with microcomputer 40 are conventional and well known and for this reason further details of this aspect of the disclosure are omitted.

The transmission of formulated communication words and the reception of identified communication words are respectively performed by special purpose interface circuitry shown in FIG. 2 as a transmit interface circuit 50 and a receive interface circuit 52. Transmit interface circuit 50 communicates with microcomputer 40 over those lines of buses 42 that carry the address and data content to the various subelements of microcomputer 40 (not separately shown herein) and which enable microcomputer 40 to communicate with external components such as the transmit and receive interface circuits 50 and 52. Thus, each of circuits 50 and 52 have a multi-line input/output port that is connected to the address bus 42a of buses 42 and another input/output port connected to the data bus 42b of the microcomputer buses 42. Address bus 42a controls the operating states of interface circuits 50 and 52 as described in greater detail below in connection with FIGS. 3 and 4, while data bus 42a transfers the contents of the formulated communication words from microcomputer 40 to transmit interface circuit 50 for transmission thereby, and transfers the contents of the communication words acknowledged and received by interface circuit 52 back to microcomputer 40 for processing and display on CRT screen 14.

For efficient data processing by microcomputer 40, transmit and receive interface circuits 50 and 52 share background data processing routines performed on a substantially continuous basis by microcomputer 40, by interrupting those background routines when transmit word processing and/or receive word processing is required. For this purpose, transmit interface circuit 50 includes an interrupt control lead 51 that extends to one of a plurality of interrupt inputs of microcomputer 40. Similarly, the receive interface card 52 includes interrupt leads 53 connected to other interrupt inputs of microcomputer 40. As described herein, the transmit interface interrupt signal on lead 51 is generated at predetermined, fixed time intervals based on a multiple of a clock signal generated in microcomputer 40 and communicated with circuit 50 over a clock signal lead 55 so that at fixed periodic intervals the background routines of microcomputer 40 are interrupted to carry out the transmit processing routine that culminates in the transmission of one or more preselected communication words on output ports 16. Receive interface circuit 52 develops its interrupt signals on bus 53 at indeterminate times triggered by the reception of a valid communicaton word or words present at receive input port 18.

Transmit Interface Circuit

Figure 3:
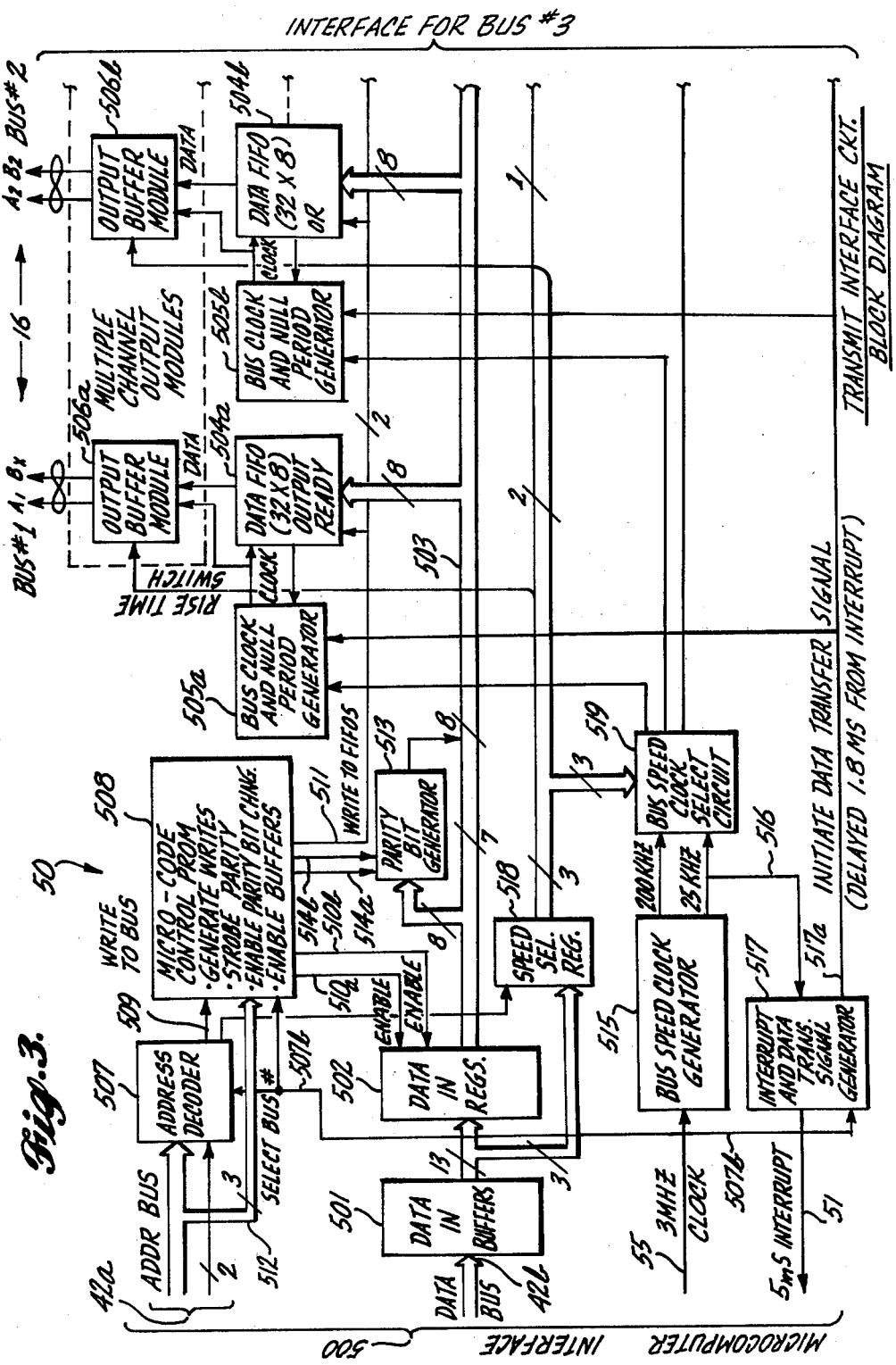
FIG. 3 is a comprehensive block diagram of the transmit interface circuit of the test set's circuitry shown as one of the blocks in the overall diagram in FIG. 2.

Transmit interface circuit 50 is more specifically shown by the detail block diagram of FIG. 3. Circuit 50 in general serves to receive the formulated communication word or words from a memory section of microcomputer 40 (FIG. 2) and to format that data so as to be suitable for transmission from one or more of the plurality of three output channels, only two of which are shown in FIG. 3 as bus number 1 (leads $A_1$ and $B_1$) and bus number 2 (leads $A_2$ and $B_2$). As explained in greater detail hereinafter, the operation of circuit 50 is coordinated with that of microcomputer 40 (FIG. 2) by using a clocked interrupt signal generated by circuit 50 at predetermined intervals, such signal instructing the microcomputer to interrupt its background processing operations and carry out a transmit interrupt routine during which microcomputer 40 is coupled to circuit 50 over address and data buses indicated at microcomputer interface 500 shown on the left-hand side of FIG. 3. In addition to the communication word itself (31 bits of data and a flag bit indicating parity type requested), three bits of information are sent to select either a high or low speed clock for each bus. There are four distinct addresses used by the circuit; one for each bus and one for the bus speed select register 518. The selection of a high speed bus selects the 200 KHz clock out of 515; the low speed selection selects the 25 KHz out of 515. The selected clock is effectively divided by 2 in 505a to yield data bit rates of 100 KHz and 12.5 KHz to meet the requirements of the ARINC 429 specification. The speed select bit out of 518 is also used to change the rise time to meet the ARINC 429 specification.

A bus speed clock generator 515 receives a fundamental clock signal, in this instance at three megahertz from microcomputer 40 via interface 500, and from this clock frequency generates on separate outputs, a high speed clock, here being 200 kilohertz in this case, and a low speed clock of 25 kilohertz. The low speed clock is fed over line 516 to an interrupt and data transmission signal generator 517 which produces a periodic interrupt command signal on lead 51, at 5 millisecond intervals, each such interrupt command causing microcomputer 40 to interrupt background processing and all other interrupts to carry out the transmit interrupt routine which ranks as highest priority. At a fixed phase delay from the five millisecond interrupt signal, generator 517 also produces an initiate data transfer signal that is connected in parallel over lead 517a to each of the bus clock and null period generators 505a, 505b to cause the associated generators to transfer the communication word from the FIFOs 504a, 504b to the associated output modules 506a, 506b whenever the FIFOs have produced an output ready signal indicating that the full 32 bit communication word is available in the associated data FIFO. The paragraphs that follow describe the data flow from microcomputer 40 to output modules 506 in more detail.

The microcomputer interface 500 includes data-in buffers 501 connected to data bus 42b of microcomputer 40. The data-in buffers 501 provide data to either the 8 bit 518 speed select register or the 16 bit (2×8 bit) 502 data registers. The register being written to is determined by the address supplied on microcomputer address bus 42a and address decode circuitry 507. The three least significant bits of the address bus 42a are used to determine which Tx bus (1, 2 or 3) the microcode control section will write to if a write to bus has been decoded. The write to data bus signal 509 sets a flag telling the microcode circuitry 508 to process the data. An address decode signal 507b, which is sent to acknowledge interrupt 51, clears the interrupt and also tells microcode circuit 508 that the next data in will be the first 16 bits of the ARINC 32 bit data word.

The microcode section 508 (consisting of various TTL logic devices and a fusible link PROM) of circuit 50 controls writing of data, and generation of parity for output to data FIFO 504a, 504b or bus 3 FIFO (not shown). The bus number is determined by the three select bus number bits 512 at the time of write to bus signal 509 decode. The writing of data from registers 502 to the bus FIFOs is done in two stages. During the first stage, ARINC bits 161 are in the data in register 502. The following steps describe the first stage: (1) ARINC bits 8-1 output from 502 onto bus 503 using enable 510a; (2) the parity is clocked into the parity generator 513 by signal 514a; (3) the data is then written to the selected bus FIFO; (4) ARINC bits 16-7 are output from 502 onto bus 503 using enable 510b; (5) the parity is accumulated by 513 using signal 514a; (6) the data is written to the selected bus FIFO; (7) a flag is set indicating that the next 16 bits are ARINC bits 32-17 (set second stage flag). The second stage is initiated by the next write to the data in register 502. The steps for stage two are as follows: (1) ARINC bits 24-17 are output from 502 onto bus 503 using enable 510a; (2) parity is accumulated by 513 using signal 514a; (3) the data is written to the selected bus FIFO; (4) ARINC bits 32-23 are output from 502 onto bus 503 using enable 510b; (5) parity is accumulated by 513; (6) if bit 32 is a one, the odd parity is generated by 513, if bit 32 is a zero, then odd parity is generated (this change is allowed by signal 514b); (7) the 7 data bits and 1 data bit are then written to the selected bus FIFO. Once the data has been written to the bus FIFO, the selected bus circuitry 504, 505, and 506, along with their inputs from 518, 519 and 517, handle transmission of the ARINC data in its specified electrical format.

Each ARINC 429 output consists of a data storage FIFO 504a, 504b and 504c (not shown), a bus clock and null period generator 505a, 505b and 505c (not shown) and a TTL to ARINC 429 conversion module 506a, 506b and 506c (also not shown). Each bus is independent of the other and a description for bus 1 operation follows.

The data written to 504a data FIFO via bus 503 as described above propagates to the output of the FIFO, causing the output ready signal to go high. The initiate data transfer signal (common to all buses) along with the output ready signal, sets a flag in the bus clock and null period generator 505a. This flag supplies an address line to a microcoded UVPROM within 505a which generates a 32 bit data clock with four null periods. This clock will be generated as long as the FIFO 504a contains data (the number of ARINC 32 bit words is determined by software but is limited to 8 ARINC words). The bit clock rate generated is one-half the bit rate supplied by the bus speed clock generator 515 as selected through bus speed clock select circuit 519 and speed select register 518. The 32 bit data clock gates the FIFO data serially out of the data module 506a. The data is AND gated with the bus clock and null period signal. When the clock is low or a null period is being AND in the output buffer module will generate a null state output as specified in the ARINC 429 specification.

The output buffer module takes the gated data signals (data not and clock, data and clock) and generates the bus $A_1$ and $B_1$ bipolar differential outputs. The same discrete logic signal from register 518 that selects the high or low clock speed outputs of circuit 519, also is connected to the rise time switch of the associated output buffer modules 506a, 506b and a like module for the third channel (not shown in FIG. 3).

The rise time switch signal applied to each of output buffer modules 506a, 506b changes a resistive/capacitive rise time determining circuit in the output module to change the bandwidth and hence rise time of the module to a rate compatible with the high or low speed data transmission.

Each bank of transmit switches Tx1, Tx2 and Tx3 on control panel 11a of set 11 are read by the transmit interrupt routine stored in microcomputer 40 and described more fully hereinafter, to thereby allow a selection of up to three different transmit words to be made available to the transmit interface circuit 50 for being outputted on any one or more of output buses numbers 1, 2 or 3 (the third bus being omitted in FIG. 3).

Receive Interface Circuit

Figure 4:
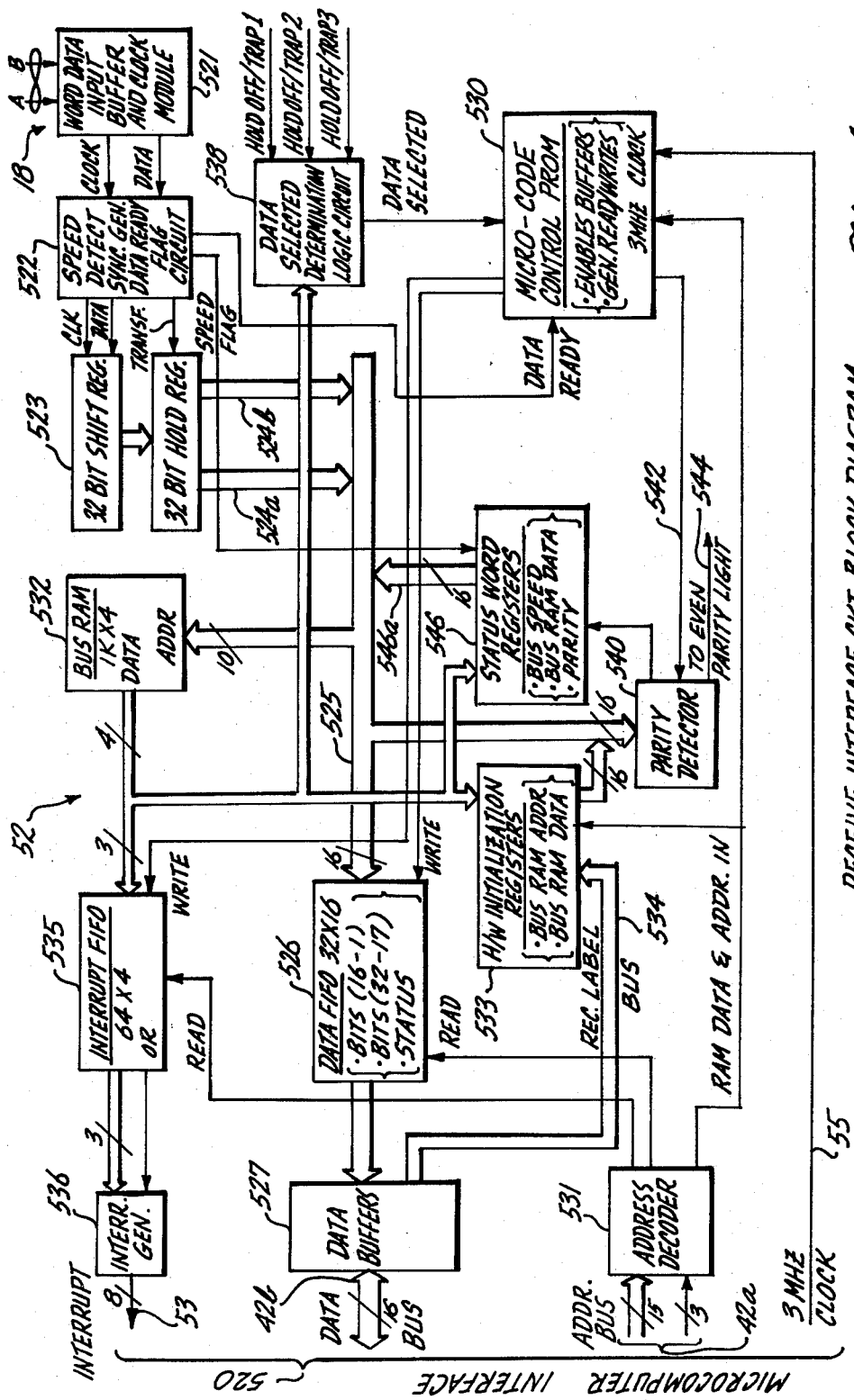
FIG. 4 is a comprehensive block diagram of the receive interface circuit that is depicted as one block in the overall diagram of the test set in FIG. 2.

Receive interface circuit 52, a detail block diagram (the actual circuit has interface for two buses to provide option of additional channel) of which is shown in FIG. 4, functions to accept binary encoded word labels that have been previously chosen by the user, and to selectively retrieve the corresponding 32 bit words when they appear on the LRU communication bus. The label or labels of the words are received by circuit 52 from microcomputer 40 through interface 520 and the label once stored in circuit 52 is repetitively compared with the corresponding label and SDI fields of the 32 bit communication word or words received at input port 18 from the monitored communication bus. When a match is detected between the desired label and SDI stored in circuit 52 and a label of a received communication word at port 18, circuit 52 generates an interrupt signal that is connected through interface 520 back to microcomputer 40 (FIG. 2) causing microcomputer 40 to call up a receive interrupt routine. That routine retrieves the complete communication word from circuit 52 and then processes the word for display on screen 14 of control panel 11a, in both binary and engineering notation. Each word selected on the Rx page is initialized to request a specific interrupt.

Also, functioning under the control of a special receive-all (Rx-all) routine selected by switch 20c, circuit 52 monitors a communication bus connected to receive port 18 and passes the complete 32 bit communication words through interface 520 into microcomputer 40, where the labels are converted into a three digit octal code and displayed on CRT screen 14 of control unit 11.

The Rx-All routine is associated with one of the eight interrupts 53 in FIG. 4. Each label and SDI bit combination within bus RAM 532 is set up to generate the Rx-All interrupt. When a label and SDI combination has been received, the hardware is then initialized to reject that label and SDI combination. Therefore, each label could be displayed four times if all SDI combinations were present.

More particularly, circuit 52 is shown in FIG. 4 to include a word data buffer module 521 which buffers the bipolar binary 429 signal applied at port 18 into a form suitable for processing by circuit 52, such as into TTL compatible, and strips the clock rate from the incoming binary data so that two separate outputs are developed, one for the word data and another for the clock. These inputs are applied to a speed detection syn generator and data ready flag circuit 522 having clock and data outputs that load a 32 bit serial in shift register 523, and then transfer the 32 bits stored in register 523 into a 32 bit parallel in hold register 524 in response to a transfer signal from circuit 522.

Hold register 524 is coupled to a 16 bit main data bus 525 via two separate 16 bit parallel outputs 524a and 524b which function to successively apply the 32 bit communication word stored in register 524 to bus 525 in two successive 16 bit bytes.

A data FIFO 526 has a 16 bit parallel data input connected to bus 525 for receiving two successive 16 bit data words plus one status word, and has a parallel 16 bit output connected through data buffers 527 to the data bus 42b of microcomputer 40 at interface 520. Data FIFO 526 functions under the control of write and read signals developed respectively by a microcode control PROM 530 and an address decoder 531 to pass the communication word onto data buffers 527 and hence to data bus 42b only if the communication word's SDI and LABEL look up a bus RAM 532 data value other than zero, as determined in the initialization process.

Microcode control PROM 530 is a fusible link programmable read only memory programmed to supply write signals to write word data to data FIFO 526 and to write RAM data to interrupt FIFO 535 in response to a data ready signal received from circuit 522 and data selected signals from trap/hold-off logic circuit 538.

The microcode PROM control section processes hardware bus RAM initialization and data reception or rejection processes. It also controls parity and status word processing. The microcode is clocked by the processor clock (phase 3) at 3 MHz.

Bus RAM 532 is loaded using one or more desired communication word labels by means of multi-bit address signals generated in microcomputer 40 and applied to address decoder 531 of circuit 52 via the address bus 42a of microcomputer 40. Decoder 531 responds to the parallel in address signals and produces bus RAM data and addresses which are stored in hardware initialization registers 533 which in turn initialize the bus RAM 532 with the desired RAM data using associated label and SDI as an address.

Initialization registers 533 are formed by three 8 bit registers for holding 10 bits of the communication word that designate the source or destination of the word and its label, and also contain 4 bits of data to control parameter word selection (1, 2, 3 or Rx-All). Registers 533 also respond to a feed back bus 534 on which the received labels read from data FIFO 526 into data buffers 527 and fed back to registers 533 to zero those addresses held in registers 533 and thus define those labels of communication words that have been received and advanced through data FIFO 526.

When bus RAM 532 has been thusly loaded with the desired data, an address input thereto connected to the main data bus 525 of circuit 52 monitors the label and SDI portion of each 32 bit communication word received through module 521, circuit 522 and registers 523 and 524. When a matching word label and SDI occurs, the data output of RAM 532 acts through interrupt FIFO 535 to cause a multi-level priority interrupt generator 536 to generate one of a plurality of interrupt signals on leads 53 connected to separate interrupt inputs of microcomputer 40. Interrupt FIFO 535 will respond to the data output from bus RAM 532 only upon receiving a write signal from PROM 530 which in turn coordinates the operations of data FIFO 526 and interrupt FIFO 535. The data selected determination logic 538 will not send a data selected signal to microcode section 530 if the hold-off trap signal is high or if the 4 bit bus RAM data is zero. The hold-off signal is initiated by reception of the selected Rx word and the time the data is rejected is determined by the potentiometer setting of corresponding control 32a, 32b or 32c of set 11 (FIG. 1). If the control is in the trap mode, the first reception of the corresponding word will set rejection signal until the control is taken out of the trap position.

A parity detector 540 is connected to the main data bus 525 of circuit 52 for determining whether the 32 bit communication word is odd or even parity in response to an enabling signal received over lead 542 from PROM 530 which has determined that the data is ready in response to a data ready signal from circuit 522. Detector 540 thus selectively energizes the even parity light over lead 544 which extends to module 30 of control panel 11a (FIG. 1). Status word registers 546 receive bus feed, bus RAM and parity data respectively from circuit 522, registers 533 and parity detector 540 and format a status word containing the above information, making it available for retrieval by microcomputer 40 via interface 520 along with the binary content of the communication word.

Microcomputer 40 is programmed as described more fully hereinafter, in conjunction with FIGS. 9-18 to coordinate the operations of transmit and receive interface circuits 50 and 52, respectively, via the various address, data and control buses 42 as described above, as well as keyboard and operator controls 44, CRT and CRT controller 46 and plug-in EPROM 48. The resulting signal and data processing provide test set 11 with a variety of operator selected test modes including as mentioned above, a transmit/stimulus mode for transmitting one or more multiple bit communication words to an LRU system and displaying such words in both engineering and binary notation, and a receive/monitor mode in which one or more multiple bit communication words are received from such a bus and again displayed in both engineering and binary notation. In the disclosed embodiment, the communication word is the ARINC 429 word. The particulars of the ARINC 429 word are defined in greater detail below in connection with FIG. 7, however, briefly, this ARINC specification calls for a 32 bit word including binary encoded information and packed discrete signals suitable for unidirectional serial transmission over a twisted pair of shielded wires. The 32 bit word is designed to accommodate the encoding of typical signals, data and other information associated with the operation of aircraft avionics, and has been standardized to promote the compatibility of airline equipment, especially with respect to the interchangeability and standardization of LRUs.

Figure 5:
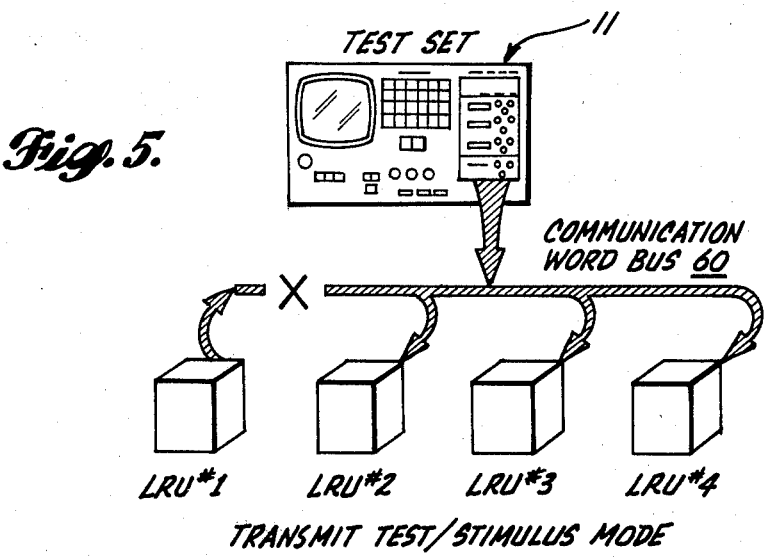
FIGS. 5 and 6 are schematic diagrams respectively illustrating a transmit (stimulus) test mode and a receive (monitor) test mode of the test set shown in FIG. 1.

With reference to FIG. 5, test set 11 is shown in a typical test setup for performing a transmit test/stimulus mode in which one or more of the transmit (Tx) outputs 16 (see FIG. 1) are connected to a communication word bus 60 which feeds binary encoded data to a plurality of receiving LRUs numbers 2, 3 and 4, to simulate the transmission of the same information by a transmit LRU number 1 which has been temporarily disconnected from bus 60. As an example, LRU number 1 might be an altimeter transducer subsystem that produces binary encoded data representing an altitude parameter of the aircraft, and LRUs numbers 2, 3 and 4 may be instruments and other subsystems that display or use such signal information for various avionic control purposes.

Figure 6:
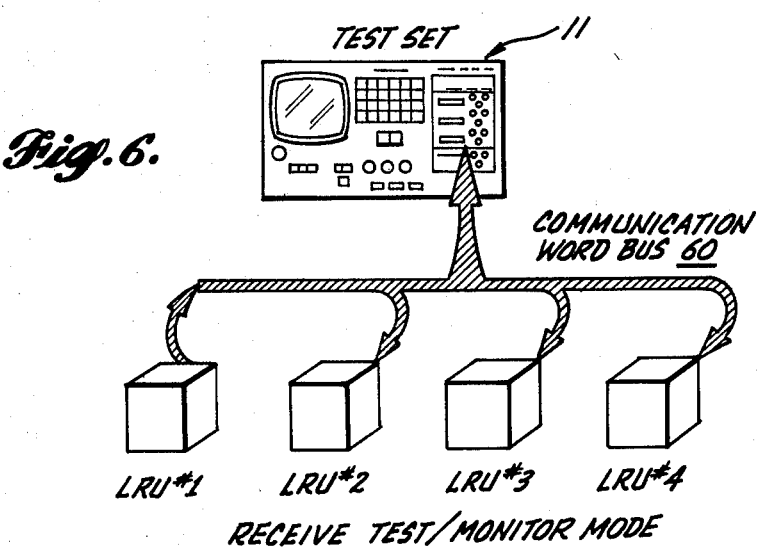

Similarly, with reference to FIG. 6, test set 11 is shown connected in a receive test/monitoring mode in which the communication word bus 60 is connected to the receive data port 18 (see FIG. 1) of set 11 for monitoring the transmission of one or more communication words from a transmit LRU number 1 to the plurality of receiving LRUs numbers 2, 3 and 4.

It will be appreciated that with these two basic test setups, and the variations thereof as described more fully below, that set 11 provides a universal digital test set capable of checking out, verifying and troubleshooting the operating conditions of LRUs within digital avionics systems and subsystems. In many avionics systems, the communication bus, such as bus 60 shown in FIGS. 5 and 6, is accessible along with most of the other avionics system buses at one or more centrally located connector strips, such as the Burndy block provided on a number of aircraft models. In both the transmit test/stimulus mode depicted in FIG. 5 and the receive test/monitoring mode depicted in FIG. 6, test set 11 provides on its CRT display screen 14 (see FIG. 1) a visual representation of the communication word both in engineering and binary forms for facilitating troubleshooting and verifying proper system operation.

Communication Word

As used herein, communication word refers to both the engineering information encoded in the multiple bit binary encoded digital word, and to the digital word itself. Thus, the communication word may be in engineering form and entered into and displayed as such by test set 11 so as to be quickly read by the operator on display screen 14 (FIG. 1) as a decoded message; alternatively, the communication word may be entered into and displayed by set 11 in the form of a digital binary word represented as 0s and 1s on the screen 14. In FIG. 7, a chart of an ARINC 429 communication word, used in the disclosed embodiment, is shown, in this instance and by way of example, for representing the altitude function or parameter. The binary encoded form of the word is shown along the lowermost row as a 32 bit digital word commencing with the bit location 1 on the right-hand side of the chart and increasing from right to left to the final bit location 32 on the far left side of the chart.

The 32 bits are divided into subgroups which when converted to engineering form, represent the following: a LABEL, occupying bit locations 1-8, which when decoded to engineering notation is an octal three digit number such as here shown as 203, which happens to represent the altitude parameter; a source, destination indicator (SDI) occupying bit locations 9 and 10 and representing, where needed, the source (LRU) or destination (LRU) of the word; a data field occupying bit locations 11-29 and including one or more spares if not required such as here shown by the spare at bit 11 (in the case of a parameter encoded in true binary (BNR) bit location 29 of the data field is used as a sign indicator, and for this parameter the zero at bit 29 plus); a sign/status matrix (SSM) at bit locations 30 and 31 for representing the sign and certain status conditions of the parameter when encoded in binary coded decimal (BCD) and representing the status of the word when the parameter is encoded in true binary (BNR); and a final bit location 32 that determines the parity—odd or even of the complete binary word.

Thus, given the bit values shown in the chart of FIG. 7 for locations 1-32, the decoded engineering form of the digitally encoded word has an octal label of 203 which the operator either will have memorized, or will use a look-up table to determine, that this particular label represents the altitude parameter. From the data field including the sign indicator at bit location 29, the altitude is +131,071.0 feet. The 1s at bit locations 31 and 32 for the SSM represent in this case a normal test indicated by the letters NL, and the parity determining bit 32 causes the word as a whole to be of even parity.

It will be appreciated that the conversion chart shown in FIG. 7 for the altitude parameter, is but one example of several hundred different parameters which are capable of being represented by the standardized 32 bit word in accordance with the ARINC 429 specification. For example, some of the other parameters that are capable of being represented with the ARINC 429 digital word are: latitude (octal code number 010), longitude (011), magnetic heading (014), ILS frequency (033), VOR/ILS frequency (034), DME frequency (035) and MLS frequency (036).

The engineering data associated with these various parameters is in general encoded into the 32 bit digital word using either of two basic codes, binary coded decimal (BCD) or true binary (BNR). As explained herein, the conversion of the communication word between engineering form and binary form and vice versa requires a determination of whether the particular parameter is a BCD word or a BNR word. One example of the different treatment of the engineering-to-binary conversion is found in the meaning of the SSM bit locations 30 and 31 and in bit 29 of the data field. For BCD encoded data the two bits at locations 30 and 31 are used as a matrix to represent the sign ($\pm$) and sign-like conditions, for the associated data field wherein 0s at bits 30 and 31 correspond to conditions of plus (+), north, east, right, to and above, and 1s at these bit locations represent minus (−), south, west, left, from and below. For the BCD encoded data, the highest order bit 29 of the data field is used as part of the data field per se in encoding the engineering values and not as a sign indicator. On the other hand, when the data are encoded in true binary, BNR, then the sign and sign-like indicators for the data are represented by the bit condition at location 29 of the data field, as in the above example of the altitude parameter and the SSM bit locations 30 and 31 represent various status conditions of the system including 0,0—failure warning; 0,1—no computed data; 1,0—functional test; and 1,1—normal operation.

In addition to the BCD and BNR encoded data, certain other code forms and packed discretes are accommodated by ARINC specification 429, however these are not pertinent to the disclosure of the invention and have been omitted from the present discussion.

OPERATION

The test set 11 (FIG. 1) has three principal operating modes. They are: transmit (Tx), receive (Rx) and receive-all (Rx-All). The transmit function generates known data, the receive function displays information in a user functional form, and the receive-all function lists all incoming word labels in octal form. Together these operating modes give the test set the ability to generate communication words in engineering notation; output programmed words on three independent buses at ports 16; receive, decode, and display in engineering notation words from any monitored bus connected to port 18; list all octal labels present on a monitored bus; provide the means to personalize the set to a particular LRU or avionics system by using specific values or exercising routines via plug-in EPROM 48, and by manually entering on-the-fly changes using keyboard 22; detect received parity errors; and select hold-off sampling rate and trap functions using controls 32. With reference to control panel 11a of FIG. 1, display 14 provides a display field of 16 lines of 32 characters for viewing transmitted and received data. Three separate display pages (transmit, receive and receive-all pages) are successively generated and displayed in coordination with the various operating modes of set 11. These display pages and the corresponding operating modes of set 11 are selected by function switches 20 on panel 11a.

Module 15 may be removed from the set to insert or remove two EPROM 48 packages. These EPROMs contain data to personalize the test set to a particular LRU or system, accessed only in the PROM operating mode selected by switch 24b. When in the MAN mode selected by switch 24a, only the word parameters formulated on the transmit page are transmitted, whereas in the PROM mode, existing data on the EPROM or EPROMS 48 contained in plug-in module 15 are transmitted prior to transmission of the transmit page data. A lighted push button module 30 denotes partity error for any received word. This error indication can be reset by pushing module 30. Three adjustable control knobs 32a, 32b and 32c labeled Word 1, Word 2 and Word 3 with minimum (MIN) to maximum (MAX) range and a trap mode, control the input sampling delay time for display purposes. In the MIN to MAX position, the holdoff functions to retard the sampling intervals of displayed received data by an adjustable amount. In the TRAP position the holdoff functions to trap and hold the last received word having the selected label.

Power Up

For initial setup prior to power-up, the data select switches 24 will be set for manual (MAN) mode, i.e., switch 24a pressed, the three receive holdoff knobs 32 should be rotated to the minimum (MIN) position, and the module 15 transmit push buttons Tx1, Tx2 and Tx3 should all be out (off). After power has been supplied to set 11 for about 15 seconds the test set 11 assumes the power-up mode and displays an engine parameter prompt on the CRT display screen 14 as depicted in FIG. 8a. Since engine pressure ratio (EPR) and Nl (variant form of engine pressure ratio) use the same ARINC 429 labels, but are scaled differently, test set 11 must be initialized for the appropriate parameter, as determined by the type of engines that power the aircraft. To make this selection the user may push either "1" (for EPR) or "2" (for Nl) on the keyboard, and the selected number will then appear in the lower left of the display. After selecting the desired engine parameter, the user then presses the enter key ("ENT") on keyboard 22. The test set 11 then automatically advances to the transmit page with the prompt "SELECT DISPLAY (Tx,Rx,Rx-All)" in the lower left of the display as shown in FIG. 8b. In this regard, each of the three principal display pages, Tx, Rx and Rx-All, provide for shifting from any display page mode to an alternative display page and associated mode.

Transmit (Tx) Display Page

As presented on the CRT screen 14, the transmit mode page shown by FIG. 8b has headings on the top line that related to an ARINC 429 communication word. Below these headings, to the left and in a column are the word/bus numbers (1, 2 and 3). The lower half of the screen has, again in columnar form, the word numbers (B1, B2 and B3) which designate the locations for the display of the binary form of communication words 1, 2 and 3. Below this left-hand column of binary word numbers is the prompt line, with the user keyboard entries appearing in the lower left of the display.

The function of the transmit page is to display all the information associated with the transmit communication words and selected output buses at ports 16. The words can be entered in either engineering or binary form and are automatically converted to the nonentered format for concurrent display of the words in decimal engineering notation, and in binary form as a plurality of 32 bits, represented on the screen as 1s and 0s.

The transmit function consists of ten basic prompts. The following list includes a brief description of these prompts, and a more detailed functional description of each is set forth hereinafter.

SELECT DISPLAY (Tx, Rx, Rx-All)—allows any one of the three functions to be displayed.

LINE?—allows selection and editing of any one of the six lines the first three being for words 1, 2 and 3 in engineering notation, and the last three 4, 5 and 6 being for the same words in binary and indicated on the screen 14 as B1, B2 and B3.

BUS SPEED?—provides for the selection and indication of one of the two bus speeds; either high speed (100 kbits/sec) or low speed (12.5 kbits/sec).

OCTAL LABEL?—identifies the particular communication word (and the corresponding parameter, e.g., altitude, air speed, etc.) selected by the user.

SDI BITS?—defines the Source Destination Indicator that either selects the source LRU or destination LRU, or in some cases extended data fields.

DATA?—defines the data field of the word when entered in decimal format.

SSM?—identifies the sign/status matrix which furnishes the sign indicator and/or status of the word.

PARITY?—allows the entry of odd or even parity.

RATE—(50, 25, 20, 10, 05, 02, 01, 00)? defines the word transmission rate; the number of times per second that the selected word is transmitted (compare with bus speed which defines bit rate).

BURST LENGTH (1–6 or 0 for continuous)?—initializes an inertial reference system (IRS) which determines how may times (1–6) an initializing transmit word will be transmitted when the burst mode is selected.

Considering each of the above Tx prompts in greater detail, it is noted that the initial Tx prompt is actually the DISPLAY SELECT prompt which allows the user to either proceed with the Tx page or shift to the Rx or Rx-All page modes. The user responds to the prompt by pressing one of the display select push buttons either Tx, Rx, or Rx-All. This results in the CRT display switching to that selected display page. Assuming that the user desires to proceed with formulating a transmit page, the enter ("ENT") key is pushed on keyboard 22 and the CRT screen 14 will then display the transmit display page with the "LINE?" prompt as depicted in FIG. 8c. It is not necessary for the user to press the Tx push button of the DISPLAY SELECT to enter the transmit display page function, since the display is initially in the transmit mode after the POWER UP sequence. The user merely has to press "ENT" to cause the "LINE?" prompt in the transmit display mode to be displayed. Hence there are four valid responses to the "SELECT DISPLAY" prompt: Tx, Rx, Rx-All and "ENT". To enter or edit the transmit word in binary notation keys "4", "5" or "6" are pressed. As described herein these keys also select transmit words 1, 2 or 3, but in binary rather than engineering form.

If the "ENT" key is pressed with no entry or with the cursor in the leftmost position, no transmit words will be edited and the "SELECT DISPLAY (Tx, Rx, Rx-All)" prompt will reappear.

If the user wishes to change the selected line number, the cursor is backed (positioned) under the number by pressing the cursor button ("←") 26a, a new number is selected, and "ENT" is pressed. This procedure for alternate selections applies to all prompt responses for the transmit and receive pages, except for the "DISPLAY SELECT" prompt.

BUS SPEED? (prompt)

This is the first prompt displayed after selecting word 1, 2 or 3. It is for selection of the bus speed only and is independent of the word. Line 1 bus speed is for BUS 1, or the top one of ports 16 on module 15, line 2 is for BUS 2, or the middle port; and line 3 is for BUS 3, or the bottom transmit port. The user may either select a high speed bus of 100 kbits/sec by pressing the "H" key on the keyboard 22, or a low speed bus of 12.5 kbits/sec by pressing the "L" key. After a bus speed is selected the user presses "ENT".

If no bus speed has been selected and a blank is where either an "H" or "L" should be in the lower left of the display, the blank is assumed to represent a high speed bus. All other entries will be ignored.

OCTAL LABEL? (prompt)

This prompt requires the user to select a three digit octal label from 000 to 377. The first digit can only be a number between 0 and 3, and the second and third digits between 0 and 7. Any of the three digits left blank will be assumed to be zero (0). When satisfied with the selected digits as displayed on screen 14, the user must press "ENT".

SDI BITS? (prompt)

In response to this prompt the user must select two digits of any combination of ones (1) and zeros (0). When selected, the user presses the "ENT" key.

DATA? (prompt)

The response to this prompt consists of up to ten characters that will be encoded into the data field of the communication word. The first character can only be a sign. Hence the user can only press a plus ("+") or minus ("−") sign indicator key on keyboard 22. The remaining nine characters can be any combination of numbers, blanks, and decimal points selected by the user. Blanks are decoded as zeros ("0"), so a decimal point (".") is required. When more than one decimal point is in the data field, only the first one is recognized and as a warning to the user all remaining decimal points are treated as a numeric digit (its value is 14). After the data sequence has been entered the user presses the "ENT" key, and the display advances to the "SSM?" prompt, discussed below.

Several special cases may exist when entering data in response to the "DATA"? prompt. These are:

Greenwhich Mean Time (BCD only):

In this case both hour digits are required. Both blanks and decimal points are treated as blanks, and will be ignored.

Example:
 06 24.7 will become 06247
 06247 will become 06247 but
 6 24.7 or 6247 will become 62470

Present Latitude and Longitude (BCD only):

In this case three degree digits are required, with blanks and decimal points being ignored. The most significant degree digit of longitude can only be "1" or "0".

Example:
 N047 29.6 will become 47296
 N 47 29.6 will become 72960
 W122 12.3 will become 122123 but
 W222 12.3 will become 022123 and
 W 22123 will become 021230

Packed Discretes:

When selecting an octal label for packed discretes the binary data field will automatically be zeroed no matter what value(s) are entered in the engineering data field.

The output word will reflect the bit pattern selected on the binary display. Therefore to enter binary data after the word is setup using lines 1, 2 or 3, the user will select the corresponding word lines (either 4, 5 or 6) and follow the binary notation input procedure described below to complete the words as B1, B2 or B3.

Parameters with Discretes in Low End of Data Field:

There are some labels or parameters that contain both engineering data and packed discretes in the low end of the data field. Entry of the data only in engineering notation will zero the discrete field. However, the discretes can be entered after the engineering data by selecting the appropriate binary line 4, 5 or 6 corresponding to B1, B2 or B3.

SSM? (prompt)

To select the Sign/Status Matrix ("SSM") the user must press either the failure warning ("FW"), functional test ("FT"), normal operation ("NL"), or no computed data ("ND") key on the middle right-hand side of keyboard 22. These keys are grouped as a 2×2 matrix on the data entry keyboard 22 as shown in FIG. 1, and correspond to the certain specified status indicators of the ARINC 429 word. When satisfied with the selected sign/status, the user then presses "ENT".

PARITY? (prompt)

To respond to this prompt the user selects either "O" for odd parity or "E" for even parity, and then after selecting the parity, presses "ENT".

RATE (50, 25, 20, 10, 05, 02, 01, 00)? (prompt)

The rate determines the number of times per second that the selected word is transmitted. To update the word rate the user must enter one of the two digit numbers contained in the prompt (50, 25, 20, 10, 05, 02, 01, 00) where a blank is a zero (0). To enter the rate "ENT" is pressed.

BURST LENGTH (1-6 or 0 FOR CONT)? (prompt)

This prompt is primarily used for the inertial reference system (IRS), which is initialized by a data burst. The user should enter "0" on the keyboard if the data is to be transmitted continuously. If the data is to be transmitted in a burst, enter the number of times (1-6) the word is to be transmitted when the BURST start push button switch 28 is pressed. When a burst length has been selected the user enters it by pressing "ENT".

Entering and Editing Communication Word in Binary Notation

As mentioned above, if the user presses keys "4", "5" or "6" on keyboard 22 (where key 4 represents line B1, key 5 line B2, and key 6 line B3) in response to the "LINE?" prompt the binary format is displayed with "P" (Parity) being the leftmost bit, and the binary "LABEL" represented by the eight bits to the far right. At this point any other keyboard entries will be ignored, except for pressing "ENT" which will call up the original prompt of "SELECT DISPLAY (Tx, Rx, Rx-All)".

After selecting a binary line B1, B2 or B3 (by using keys 4, 5 or 6), the 32 bit word line chosen by the user appears in the lower half of the display. To enter or edit individual bits, the user moves the cursor (by means of switches 26) under the desired bit location and presses key "1" or "0" on keyboard 22. In this binary entry mode the parity must be controlled manually. The number of ones (1) in the word are counted, and an appropriate "1" or "0" added in the parity position, i.e., the first bit location on the left side of the screen.

When the user has finished editing the binary word or words, "ENT" is pressed and the "RATE?" prompt reappears. The user then presses the "ENT" key again bringing up the "BURST LENGTH?" prompt. By pressing the "ENT" key again, the "LINE?" prompt will reappear with the updated data displayed on screen 14 along with the decoded engineering notation at lines 1, 2 or 3 of the binary word or words B1, B2 or B3.

Example of a Typical Transmit Display Page Sequence

The following is an example of a typical sequence for entering a communication word parameter for transmission. The example begins with the transmit page display prior to data entry as shown in FIG. 8b.

| PROMPT: | SELECT DISPLAY (Tx, Rx, Rx-All) |
|---|---|
| Response: | Tx, ENT |
| PROMPT: | LINE? |
| Response: | 1, ENT |
| PROMPT: | BUS SPEED? |
| Response: | H, ENT |
| PROMPT: | OCTAL LABEL? |
| Response: | 203, ENT |
| PROMPT: | SDI BITS? |
| Response: | 00, ENT |
| PROMPT: | DATA? |
| Response: | +131071.0, ENT |
| PROMPT: | SSM? |
| Response | NL, ENT |
| PROMPT: | PARITY? |
| Response: | O, ENT |
| PROMPT: | RATE (50, 25, 20, 10, 05, 02, 01, 00)? |
| Response: | 25, ENT |
| PROMPT: | BURST LENGTH (1-6 or 0 FOR CONT)? |
| Response: | 0, ENT |

After "0" has been entered by pressing "ENT" for "BURST LENGTH?", the CRT display 14 will be updated and the word #1 displayed as shown in FIG. 8d, wherein the word has been automatically converted to binary notation (B1) and is displayed for comparison along with the engineering word form. The formulated transmit word in this example is for the altitude parameter set forth in FIG. 7.

The word has now been formulated and is available for transmission. In order to transmit the word on a selected bus, the matrix of push buttons on the Tx/Rx module 15 are used. The push button labeled "Tx1" is for word 1, "Tx2" for word 2 and "Tx3" for word 3. The top row of push buttons are for BUS 1, middle row for BUS 2 and bottom row for BUS 3. Hence, to put word 1 on BUS 1 the user presses the leftmost push button (Tx1) in the top row.

Receive (Rx) Display Page

The receive (Rx) page mode is similar to that of the transmit (Tx) page. The Rx mode permits selection of words that the operator desires to monitor, and displays all pertinent information concerning such received words. Like the transmit word, the receive word is displayed both as engineering data represented by engineering units, and as binary data in ones and zeros, and hence requires that each received word be automatically converted (decoded) from binary notation in which it is received, to engineering notation.

The receive function consists of five basic prompts (SELECT DISPLAY, LINE?, OCTAL LABEL? and SDI BITS?). A brief description of these prompts is found above in the section on the Tx page display. The only significant difference between the transmit function prompts and the receive function prompts is that in the latter case, the "LINE?" prompt has only 3 lines that can be selected (either 1, 2, 3). Selection of "4", "5" or "6" will be ignored inasmuch as the binary form of the word will be received from the monitored bus, and is not formulated by the user.

SELECT DISPLAY (Tx, Rx, Rx-All) (prompt)

This prompt appears as shown in FIG. 8e and is responded to in the same manner as the transmit display sequence outlined above, except that the "Rx" push button 20 (FIG. 1) is pressed.

LINE? (prompt)

After pressing the "Rx" Select Display push button 20b and "ENT" of keyboard 22, the "LINE?" prompt will be displayed as shown below in FIG. 8f.

OCTAL LABEL? (prompt)

This prompt is responded to in the same manner as in the transmit display sequence discussed above, except that if the user chooses an octal label more than once on the receive page (even with different SDI bits selected) only the last entered line will receive that label and the redundant entry will be ignored.

SDI BITS (prompt)

This prompt is responded to in the same manner as in the transmit display sequence outlined above, except the user, in addition to being able to select any combination of ones (1) and zeros (0), can optionally select "dont't cares" (X) for the SDI bits entry. Any combination containing at least one "X" will result in both bits being treated as "X's" (don't cares).

Example of a Typical Receive Display Page Sequence

The following example illustrates typical responses to the Rx page prompts discussed above, and begins with the receive display prior to data entry as shown in FIG. 8e.

| PROMPT: | SELECT DISPLAY (Tx, Rx, Rx-All) |
| --- | --- |
| Response: | Rx, ENT |
| PROMPT: | LINE? |
| Response: | 1, ENT |
| PROMPT: | OCTAL LABEL? |
| Response: | 203, ENT |
| PROMPT: | SDI BITS? |
| Response: | XX, ENT |

After "XX" has been entered by pressing "ENT" for "SDI BITS?", the CRT will be updated and the information displayed as shown by FIG. 8g. *In this example, the selected octal label* 203 corresponds to the same altitude parameter used in the above example of the transmit page sequence. When the receive port 18 of test set 11 (FIG. 1) is coupled to monitor a communication bus on which the label 203 and the associated binary word is present, set 11 will automatically receive, process and display the complete word, in both engineering and binary notation as depicted in FIG. 8h.

Receive-All (Rx-All) Display Page

The receive-all page, when selected, appears as a blank display except for the prompt "SELECT DISPLAY (Tx, Rx, Rx-All)" in the lower left of the display. When valid communication words are thereafter received at port 18, the corresponding octal labels are listed starting in the upper left corner of screen 14 as shown by the example in FIG. 8i.

The function of the receive-all mode and the associated page is to list the words by octal label which are present on the data bus to which the receive port 18 is connected. The receive-all display has only one prompt. The user gains entry into this function page by pressing the "Rx-All" push button 20R on control panel 11a, in response to the "SELECT DISPLAY (Tx, Rx, Rx-All)" prompt that appears at the beginning of the transmit (Tx) and receive (Rx) pages.

In the example shown in FIG. 8i, four separate labels are displayed: 203, 033, 015 and 016, advising the user that the communication words for the parameters of: altitude, ILS frequency, wind speed and wind direction (true), received at port 18.

Microcomputer Programming

The following section pertains to a particular and preferred mode of programming microcomputer 40 of test set 11 so as to carry out the above described functions. While it is believed that the foregoing description of the various components and specific operating modes of test set 11 will enable those skilled in this art to readily program microcomputer 40, detailed flowcharts of the preferred processing are set forth in FIGS. 9–18 and are described below.

Microcomputer 40, as mentioned above, is provided by a self-contained, 16 bit microcomputer having multiple priority interrupt levels (or vectoring) and uses addressable work spaces in memory in lieu of internal program registers. Although architecturally different microcomputers may be employed, in this particular embodiment, a model TM 900/100 M microcomputer, available from Texas Instruments, of Houston, Tex. is used. The TM 990/100 is augmented by compatible expansion memory boards, also available from Texas Instruments under product designators TM 990/201 and TM 990/206. The expansion memory boards increase the computing and storage capacity of the basic TM 990/100 M microcomputer, enabling it to carry out the above specified tasks of test set 11.

Figure 9:
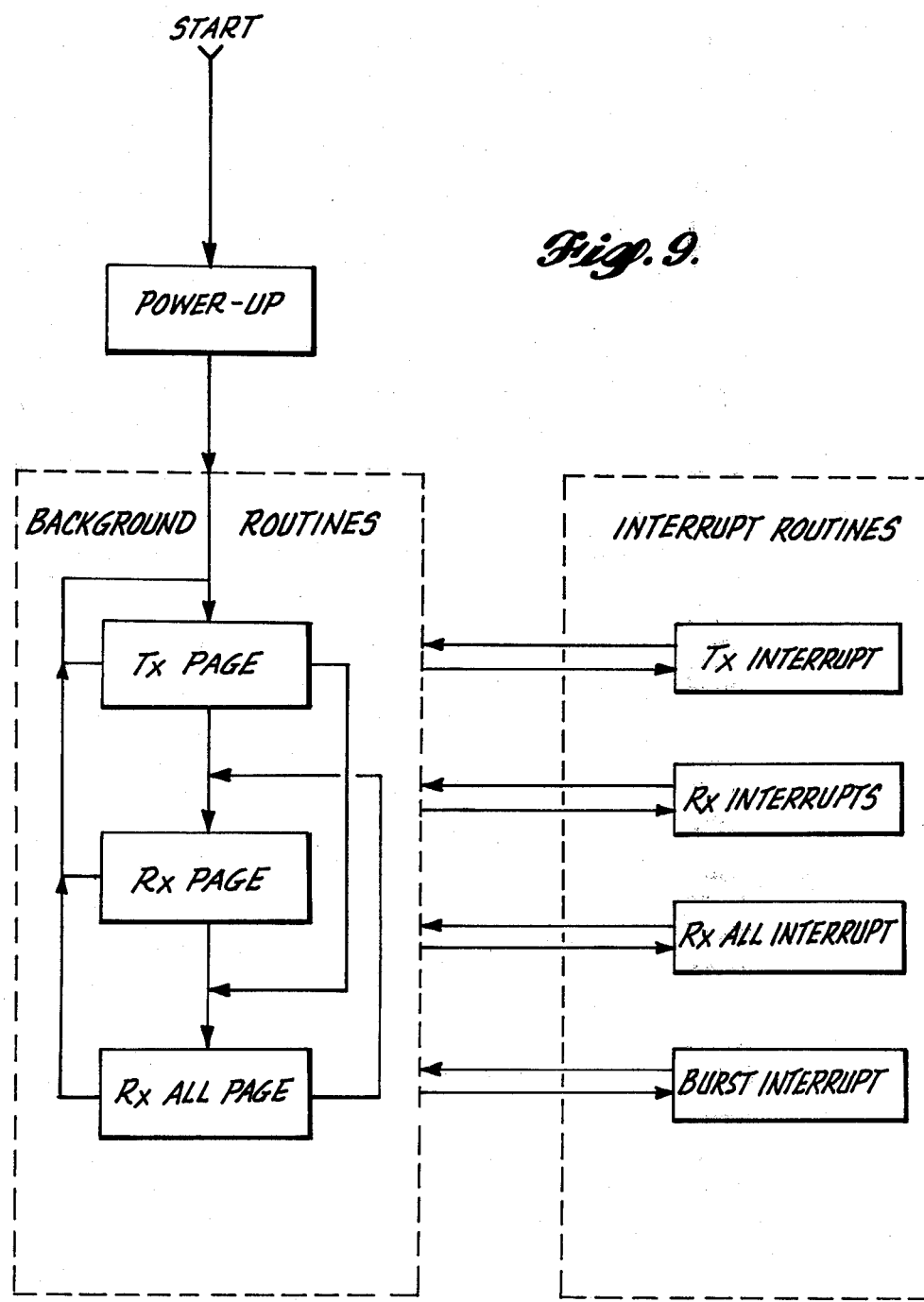
FIG. 9 sets forth a generalized flowchart of the signal processing performed by the test set.

With reference to FIG. 9, a generalized flowchart is shown to provide an overview of the various signal-processing routines carried out by microcomputer 40 in cooperation with the hardware of the transmit and receive interface circuits 16 and 18, described above (FIGS. 3 and 4). The principal processing routines are basically organized as shown in FIG. 9 into background routines including the transmit, receive and receive-all pages, and a number of vectored interrupt routines including the transmit, receive, receive-all and burst interrupt routines. When set 11 is turned on, a power-up routine initializes the system, and then leads into the transmit page routine. The transmit page routing along with the other background routines function to continuously process signal information until interrupted by one or more of the plurality of interrupt routines.

It is noted that the background routines of transmit, receive and receive-all, are interconnected in a manner that, as explained more fully below, enables the user to shift from one of the background routines to another, e.g., from the transmit page to the receive page and vice versa, in response to the display select switches 20 (see FIG. 1).

It is further noted that the various interrupt routines, although schematically shown with a single interrupt line to the background routines, do in some cases have a plurality of prioritized interrupt levels. After servicing any particular interrupt request, and assuming that no other interrupts are then present, microcomputer 40 resumes processing of the background routines. The architecture of the particular microcomputer 40 used in the presently-disclosed embodiment is such that the programs for the various interrupt routines are stored in predetermined sections of memory and the plurality of interrupts are vectored to these particular routines as required. Thus, upon receipt of an interrupt, the microcomputer executes the appropriate interrupt routine, and then returns to the location in one of the background routines where the processing was interrupted.

Figure 10:
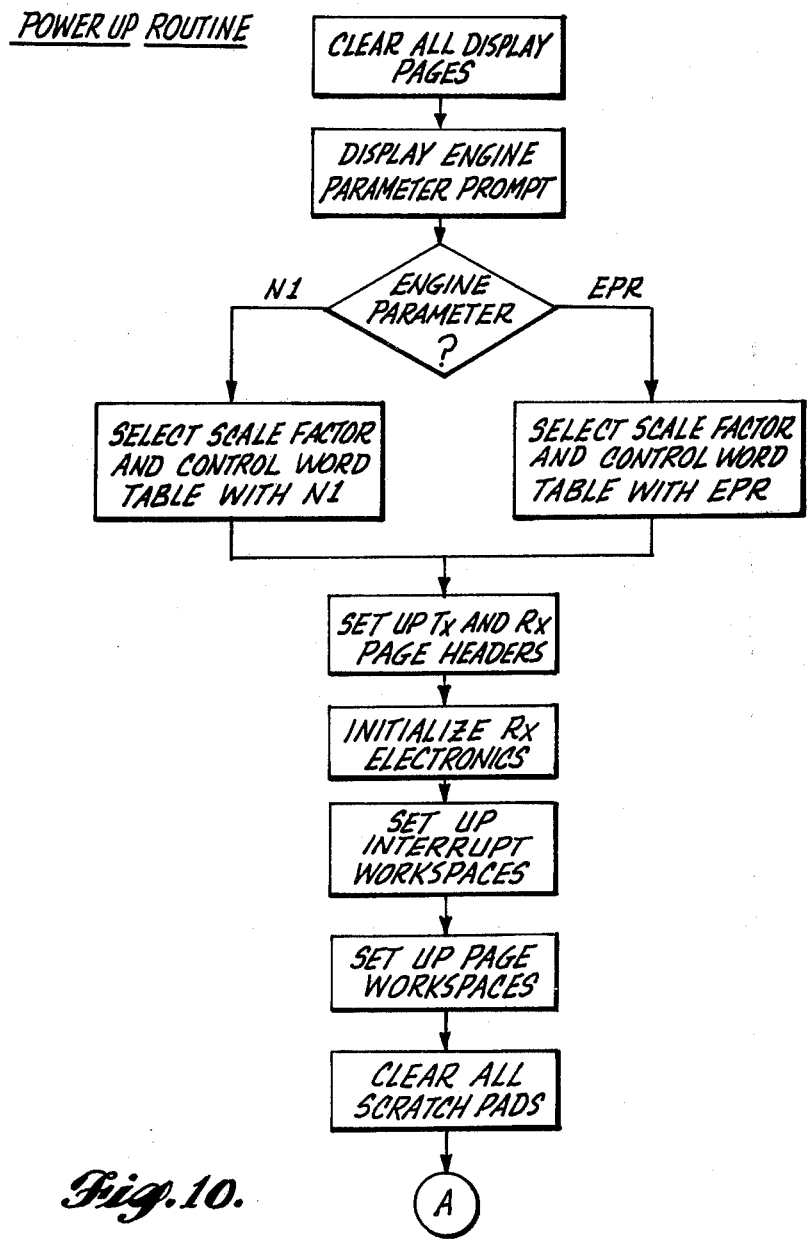
FIG. 10 is a detailed flowchart of a power-up routine shown generally in FIG. 9.

With reference to FIG. 10, the power-up routine is shown to include a sequence in which the engine parameter of EPR or N1 is selected by the operator so as to initialize the system in accordance with one of these alternate engine categories, upon which many of the ARINC 429 parameters are specified. By selecting either N1 or EPR, the microcomputer initializes the system by selecting a table of scale factors (for scaling the data field) and control words (the purpose of which is discussed below) containing the selected engine parameter. Thus, the decision block of N1 or EPR in the power-up routine of FIG. 10 is decided by a user-made selection on keyboard 22 as described above in conjunction with FIG. 8a.

Figure 11A:
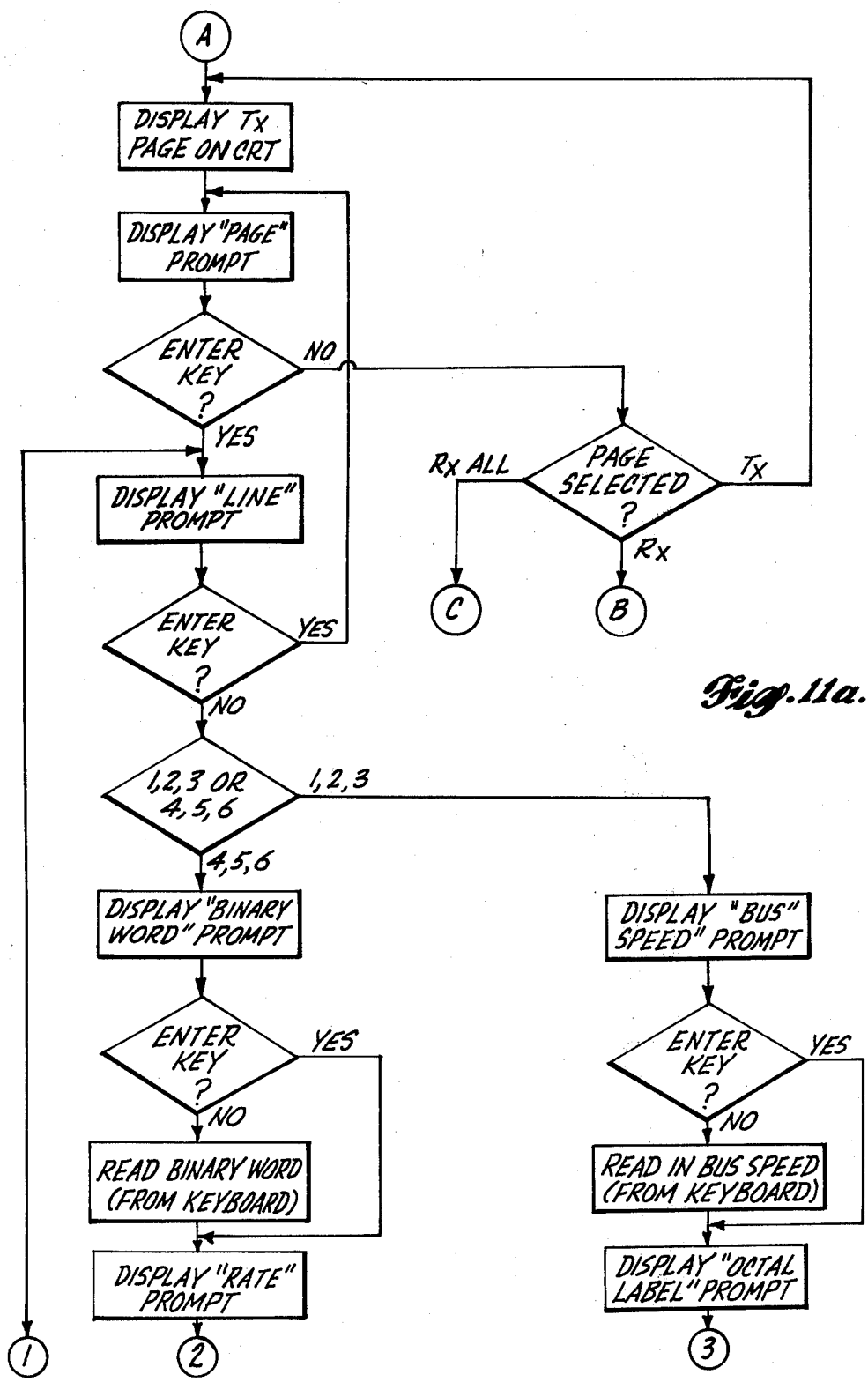
FIGS. 11a through 11c collectively form a detailed flowchart of a transmit page routine shown generally in FIG. 9.

Upon completion of the power-up routine, the program advances to point A which forms the start of the transmit page shown in FIGS. 11a, b and c. As mentioned, the transmit page is a background routine that will be carried out during each pass through the program, unless interrupted by one of the interrupt routines shown in FIG. 9. The transmit page display provides for displaying the transmit page on CRT display screen 14 (FIG. 1), including the various prompts as discussed above in connection with the transmit page sequence. Depending upon the responses to these prompts, the transmit page allows entry of the user-formulated word parameter either in engineering notation (by selecting keys 1, 2 and/or 3), or in binary notation (by selecting keys 4, 5 and/or 6). Additionally, the transmit page routine enables the user to shift to another one of the background routines by a decision block of "page-selected?", that is reached by failing to press the "ENT" (enter) key on keyboard 22 in response to the select display prompt at the beginning of the TX page.

Figure 11B:
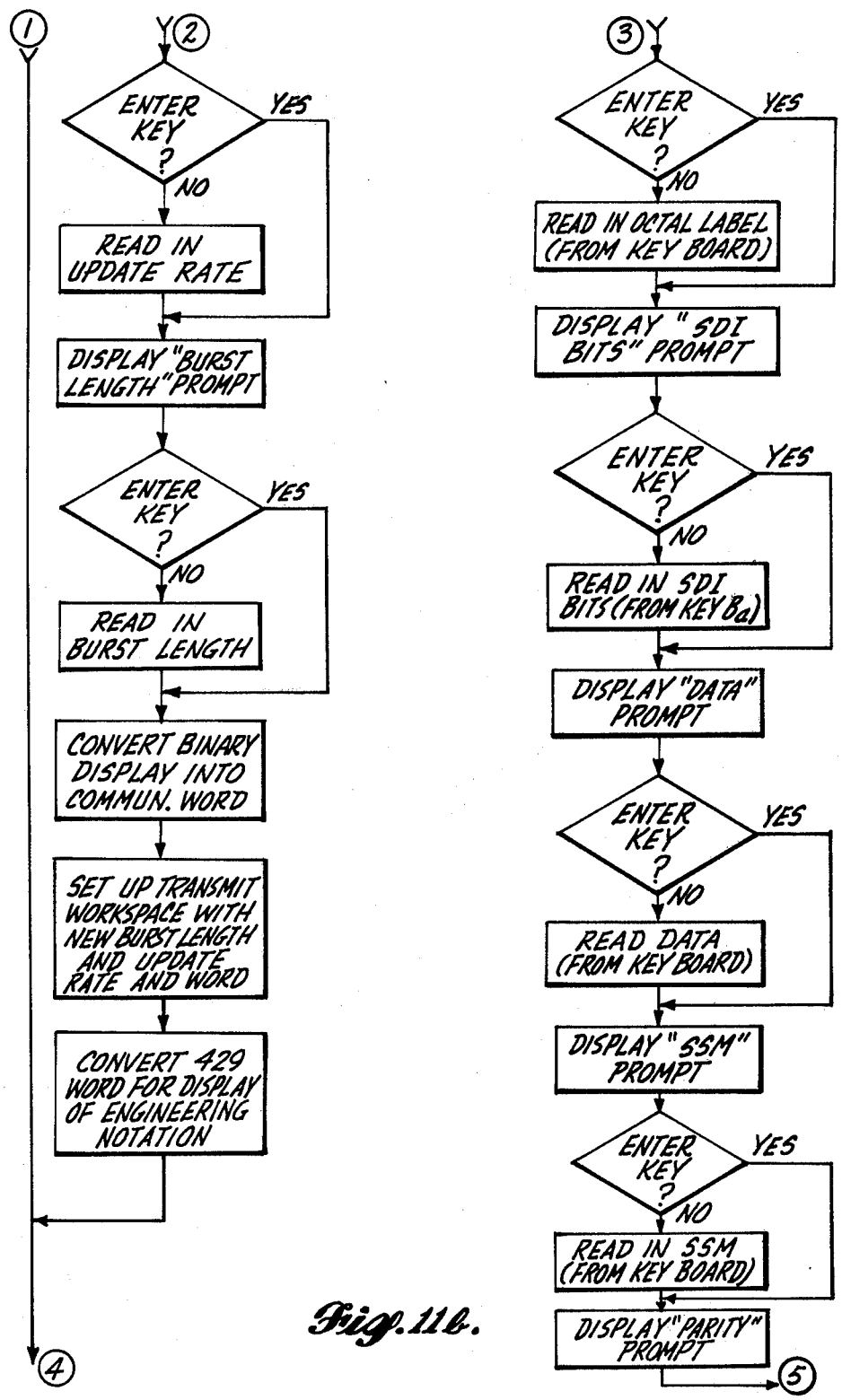
Figure 11C:
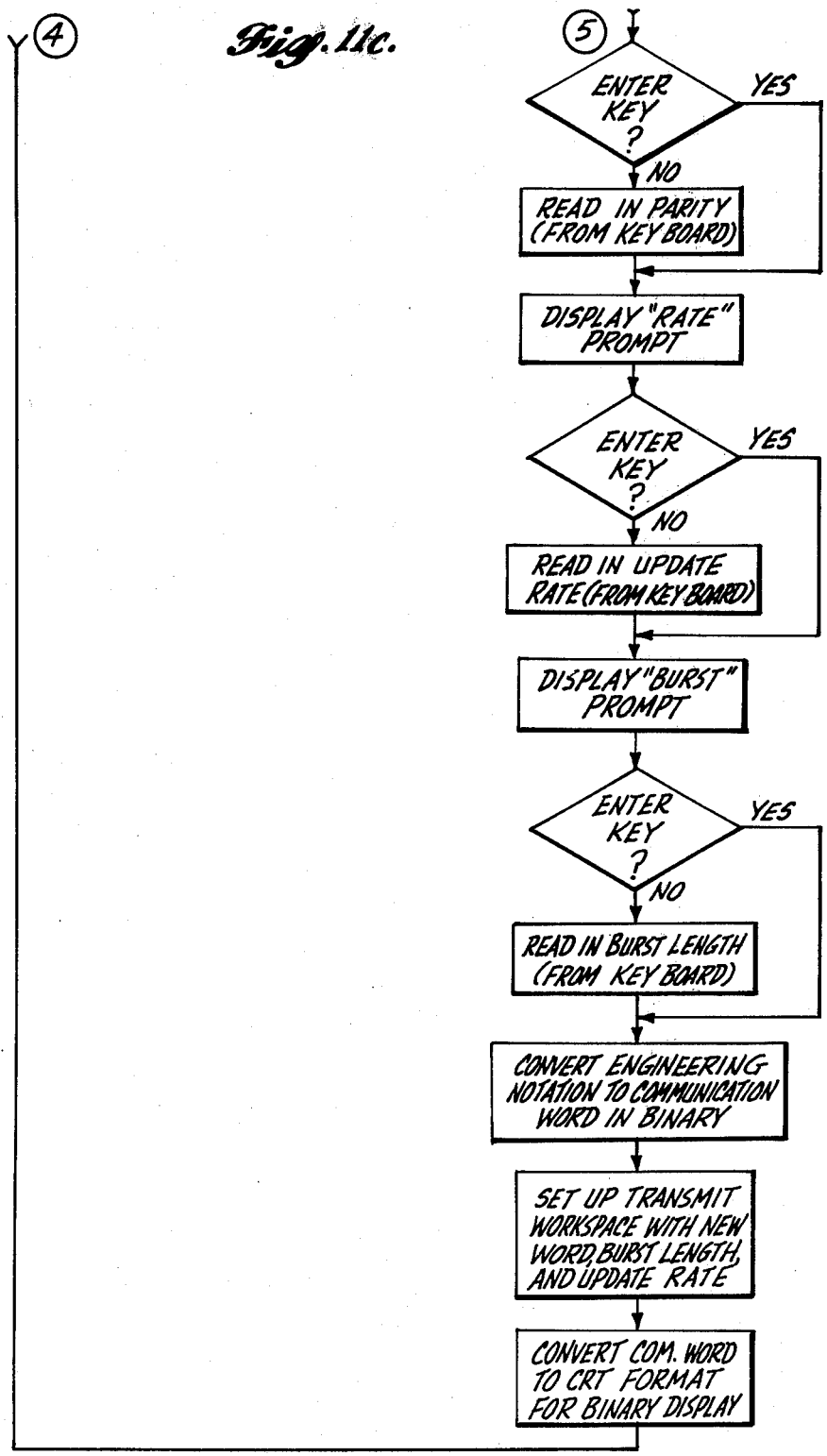

While the flow diagram for the transmit page, as shown in FIG. 11, is believed to be self-explanatory, some comment is needed with respect to the word conversion processing. Two different but related conversion procedures are required to enable display of both the engineering and binary notations of each word. One such conversion processor is shown in FIG. 11b as an instruction block of "convert 429 word for display of engineering notation" located in the branch of signal processing responsive to the user's entry of the communication word in binary notation. The other conversion step is set forth as instruction "convert engineering notation to communication word in binary" located serially in the branch of signal processing responsive to entry of the communication word in engineering form as shown in FIG. 11c. These instruction blocks represent the conversion processing necessary to effect the display of each transmit word in both its engineering and binary notations. The first-mentioned conversion block involves accepting the 429 word in its binary form, after the user has completed the entry sequence set forth on the lower left-hand side of FIG. 11a and the left-hand side of FIG. 11b, and then decoding the binary into engineering notation. This conversion processing is essentially the same as that required to decode each of the received 32 bit binary words in the receive interrupt sequence as described more fully below in conjunction with FIG. 16. Thus, for this binary to engineering conversion processing as part of the transmit page, reference is made to the detailed disclosure set forth in FIG. 16 and discussed below.

With respect to the conversion of engineering notation to binary that forms part of the transmit page processing shown in FIG. 11c, a detailed signal-processing flowchart of this conversion is collectively depicted in FIGS. 12a and 12b and is described below.

Figure 12A:
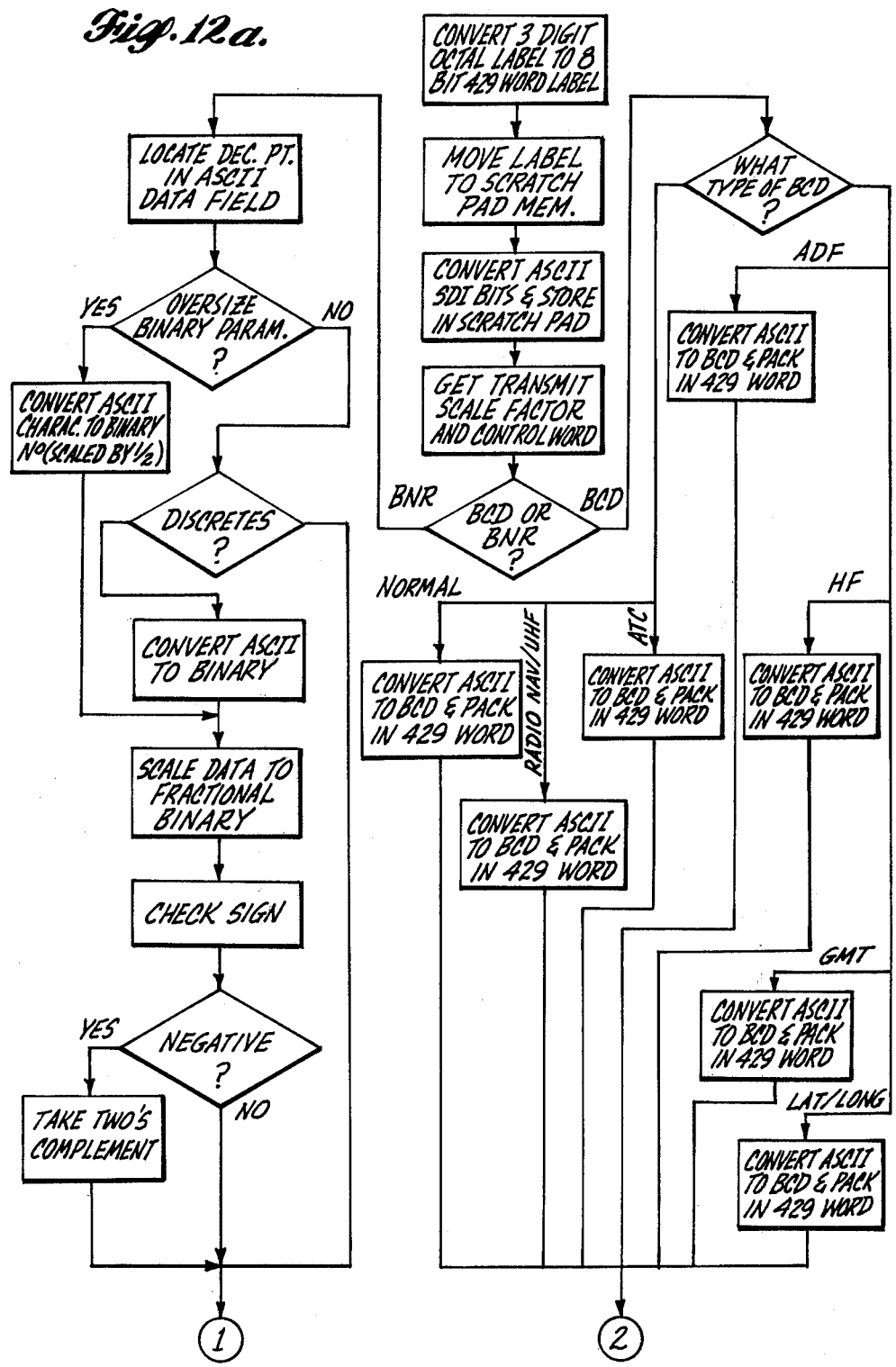
FIGS. 12a and 12b are a detailed flowchart of one subroutine occurring in the flow diagram of FIGS. 11a–11c.
Figure 12B:
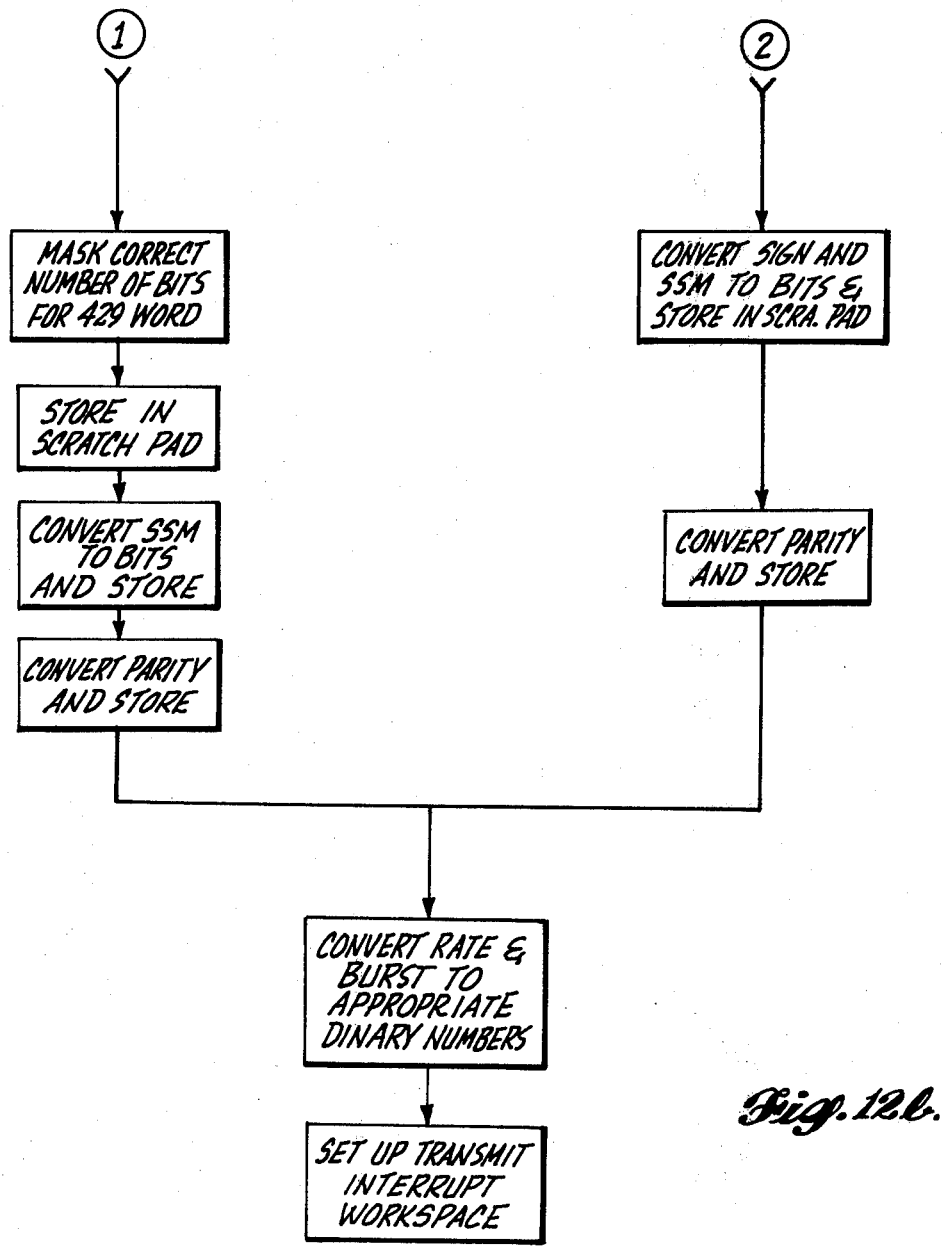

With reference to FIGS. 12a and 12b, an initial instruction in the engineering to binary conversion involves converting the three-digit octal label of the communication word into its binary encoded 8 bit form (refer to the word conversion chart shown in FIG. 7). The binary encoded label is then moved to a predetermined scratch pad memory of microcomputer 40, the ASCII engineering data and SDI bits are converted to binary and stored in scratch pad memory, and the transmit scale factor (corresponding to N1 or EPR), and the control word associated with the word label are retrieved. The scale factor is located in a nonvolatile memory and, as mentioned above, provides for the proper scaling of the data field of the communication word.

Following the retrieval of the scale factor and control word, a decision is made, based on the previously-retrieved control word, as to whether the engineering data is encoded in true binary (BNR) or binary coded decimal (BCD). From this decision, the signal processing branches into two different sections, each being programmed to encode the data field, SSM and SDI into the proper binary bits that will formulate the complete 32 bit transmission word. Upon completion thereof, these separate processing branches merge at an instruction block that converts the bus speed bit rate, burst requirements and partity to appropriate binary numbers which together form a status word and the resulting consolidated binary transmit word and status word are then set up in a transmit interrupt workspace that cooperates with a transmit interrupt routine stored in an associated workspace in the microcomputer memory.

The above mentioned control word is retrieved from a look-up table addressed by the word label and serves to define whether the particular word is to be encoded in a BNR or BCD, and further defines the word. The control word thus controls the encoding operations that follow, as shown in the flowchart of FIGS. 12a and 12b.

Figure 13A:
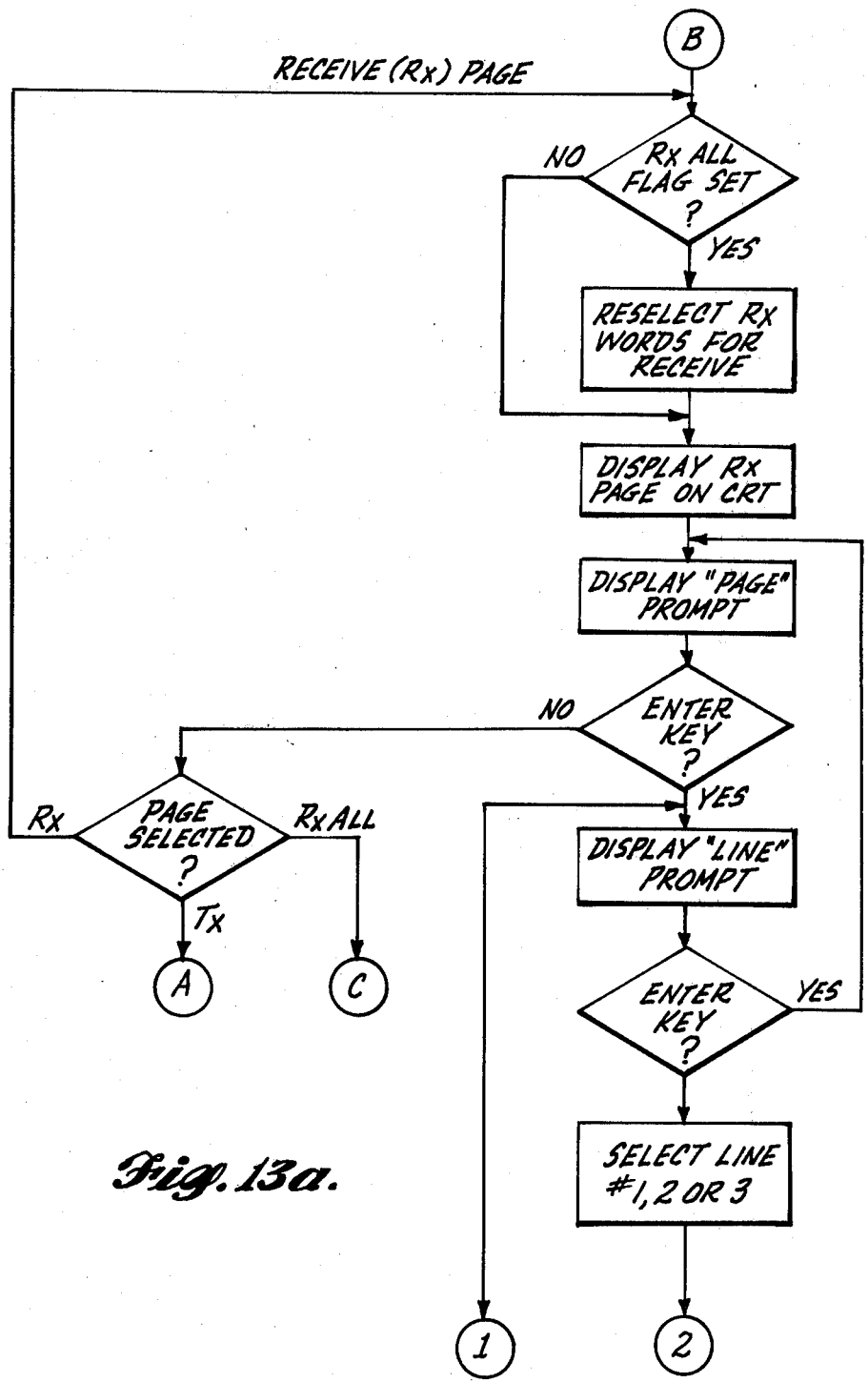
FIGS. 13a and 13b are a composite detailed flow diagram of a receive page routine shown generally in FIG. 9.
Figure 13B:
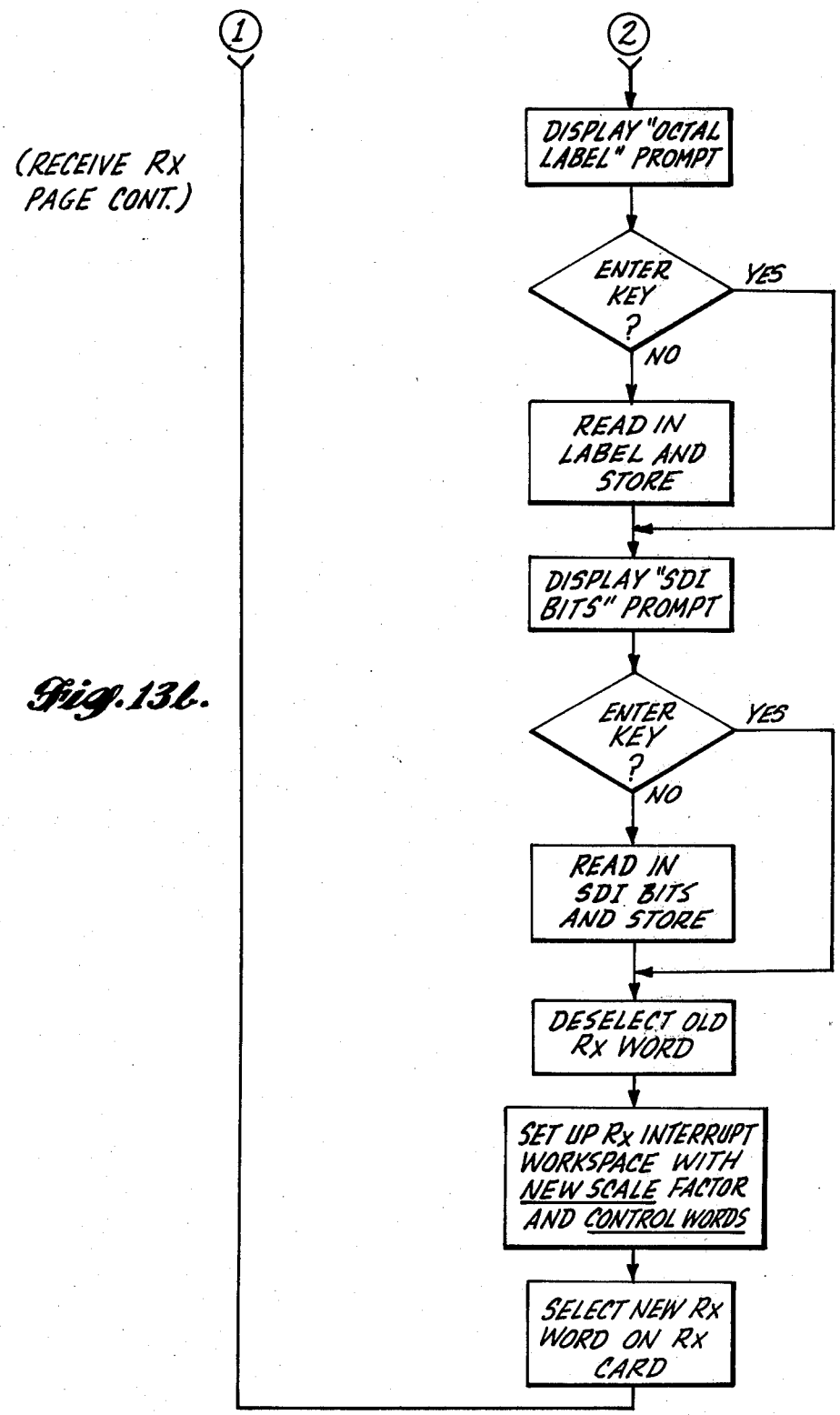

With further reference to FIG. 9, the next background routine is that of the receive page which can be reached from either the transmit or receive-all pages. The particular signal processing of the receive page is shown in FIGS. 13a and 13b, and commences at B and proceeds through a preliminary series of decision and instruction blocks which enable the user to shift from the receive page to either the transmit or receive-all pages. If the user is to stay with the receive page, the "ENT" key will be entered and a corresponding decision block will direct the processing through the series of user prompts commencing with the "LINE" prompt. As the user responds to these various prompts, the octal label which defines the word that the user desires to receive is entered along with the SDI bits, and responsively the Rx interrupt workspace is set up with the proper scale factor and control word retrieved from a look up table in response to the user entry of the octal label. With the Rx interrupt workspace thusly set up, the selected Rx word or words are then identified so that a succeeding receive interrupt routine, described below, will detect the presence of the selected communication word or words on the avionics data bus and will automatically process such words for concurrent display in engineering and binary notations.

With further reference to FIG. 9, the receive-all page is another of the background routines reached by means of the preliminary signal processing provided in the transmit and receive pages as described above. As more specifically shown in FIG. 14, the receive-all page commences at C and proceeds through a series of instructions that set the Rx-All flag, clear the Rx-All page and display the Rx-All page on the CRT in preparation for selecting and displaying all of the received word labels present at the receive port 18 and made available to the CRT display by the receive-all interrupt routine described more fully hereinafter. In addition to displaying the octal labels of all of the communication words received on a monitored bus, the CRT display is caused to display the "page select" prompt as indicated by the last instruction block of the receive-all routine in FIG. 14 and as shown in FIG. 8i. Following the "select display" prompt instruction, a decision is made as to whether the user has selected the receive-all, transmit or receive pages and the flow of the program is directed accordingly to the beginning point C of the receive-all page, or the beginning point A of the transmit page or the beginning point B of the receive page.

Again with reference to FIG. 9, the above-described background routines are ongoing routines that are under the control of the user-operated switches and keys on control panel 11a of test set 11 (FIG. 1). The plurality of interrupt routines are organized in accordance with the particular architecture of microcomputer 40 such that each interrupt service routine is located in a predetermined memory location, and is reached in response to an interrupt command generated by either transmit interface circuit 50, receive interface circuit 52 (which incorporates both the receive and receive-all interrupt functions), or a burst interrupt initiated by the start switch 28 shown on control panel 11a. After completing the interrupt service routines, which are described in detail below, microcomputer 40 returns to the execution of the various background routines.

Thus, with reference to FIG. 15, the transmit (Tx) interrupt service routine is shown on the left-hand side of FIG. 15, and an associated transmit subroutine is shown on the right-hand side of FIG. 15, the latter being called upon at three separate processing locations within the principal transmit interrupt routine. In general, the transmit interrupt routine is activated in response to periodic clock interrupts generated by the transmit interface circuit 50 as described above in connection with FIG. 3. The three possible transmit words are successively set up and transmitted as indicated by the redundant operations shown in the main interrupt service routine on the left-hand side of FIG. 15. After a workspace pointer is loaded for transmitting word number 1, an update counter (one for each possible transmit word) is decremented and if the word is ready to be transmitted, the transmit subroutine is called. With reference to the right-hand side of FIG. 15, the transmit subroutine successively resets the update counter, looks for a burst flag and determines whether the word is to be transmitted as a burst. If not, the routine jumps down to a series of decision and instruction blocks which determine whether any of the set of three transmit word switches TX1, TX2 and TX3, associated with each output bus of ports 16 of module 15 (see FIG. 1) have been selected by the operator and directs words 1, 2 and 3 accordingly to the proper output buses of ports 16, and then returns to the main interrupt service routine on the left-hand side of FIG. 15. The transmit subrouting resets the update counter in accordance with a predetermined value depending upon the word transmission rate selected by the user, as described above. This chosen update rate determines the frequency at which the word as a unit is transmitted. The bit rate in contrast is controlled by the transmit interface circuit 50 in response to the user-chosen bit rate as described above in connection with FIG. 3.

If the word is to be transmitted as a burst, a burst parameter will be acknowledged by the decision block in the upper portion of the transmit subroutine, and a succession of decision and instruction blocks will cause the word to be transmitted by the number of times set on the burst counter, whereafter the transmit subroutine is completed as described above by directing the transmit word or word to the proper output buses in accordance with the user-selected status of switches TX1, TX2 and TX3 for each output bus.

Upon return from the transmit subroutine, the main transmit interrupt service routine on the left-hand side of FIG. 15 repeats the above-described tasks for first, word 2 and then word 3, in each case calling forth the transmit subroutine as indicated, and then returning from the interrupt to the background routines, as shown in FIG. 9. The transmit interrupt routine has the highest priority of the various interrupts and hence will predominate when there are conflicting interrupt demands on microcomputer 40.

The receive interrupt service routine shown generally in FIG. 9 is detailed in FIG. 7 and, as depicted, commences with a receive data interrupt command generated by the receive interface circuit 52 in response to the receipt by that circuit of communication words that have the designated label or labels. Responsively, microcomputer 40 is directed to a receive interrupt routine, whereupon the signal processing, as shown in FIG. 16, services the receive interrupt request. In particular, following the receive data interrupt, all interrupts are temporarily disabled so as to permit time to remove the data and status of the received word or words to the workspace associated with the above-mentioned routine containing the interrupt service program so that the receipt of valid words in the meantime does not disrupt the transfer to the workspace of previously-accepted receive words. Thereafter, the interrupts are enabled.

Following reenablement of the receive interrupt, the status word, formulated as described above in the receive interface circuit 52 shown in FIG. 4, is decoded for word parity and bus speed, and the 32 binary bits of the word are converted to 32 ASCII characters of (1) ones and (0) zeroes for displaying the binary form of the word on CRT display screen 14 (FIG. 1). It is noted in this regard that, although the communication word is received in binary notation, the signals representing the word are in the form of electrical conditions or states of registers and other circuitry within the test set, and such electrical states must be converted to ASCII characters meaningful to the CRT display controller 46 (FIG. 2) for displaying the numbers 1s and 0s to symbolize the bit states.

Following the foregoing bits to ASCII conversion, the associated control word, previously retrieved in response to the label selection, is interrogated to assist in the decoding of the binary communication word. The control word indicates whether the associated binary communication word has been encoded in BNR or BCD, the type of sign, etc. Thus, armed with the control word and sign information, a decision block as shown in FIG. 16 determines whether BNR or BCD decoding is required and accordingly splits the signal processing into two separate branches, depending upon whether the word is determined to be BCD or not. If not, then the BNR decoding branch shown on the left-hand side of FIG. 16 successively determines the sign character and stores the sign, then isolates the data field and makes the data field absolute in the 2's compliment. The data field is then scaled in accordance with the previously-selected scale factor, and is converted to BCD, as an interim step. The BCD encoded data is converted to ASCII, and lastly the SSM bits are converted to ASCII, completing this branch of the decoding sequence.

If the control word identifies the binary communication word as being encoded in BCD, the signal processing branch shown at the right-hand side of FIG. 16 carries out a succession of decoding tasks, including: determining the sign character of the word; determining whether the word is normal BCD, and if yes converting it to ASCII; determining whether it is a radio frequency, and if yes performing the special subroutine shown; determining whether Greenwich mean time is represented and if yes converting it to ASCII; detecting for a packed discretes and if yes putting the word "discretes" in the data field of the decoded word; and if none of the above parameters are present, it is assumed by elimination logic that the word represents latitude/longitude and the data is converted to ASCII as shown. The separate, parallel conversion branches are then merged into one and the associated SSM bits are converted to ASCII. The two separate branches of the routine are now combined and the decoded word in the form of ASCII is stored in a memory of CRT controller 46 (FIG. 2) for presentation on CRT display screen 14 in a conventional manner. The interrupt service routine of FIG. 16 has now been completed and the flow of the signal processing returns to the background routines shown in FIG. 9.

While the received interrupt that initiates the signal processing shown in FIG. 16 is symbolically represented as a single interrupt, in fact the chosen Rx labels for words 1, 2 and 3 generate separate, prioritized interrupts as described above in connection with receive interface circuit 52 of FIG. 4, so that these prioritized interrupts vector to workspaces within the microcomputer memory that provide for individual decoding of each of the receive words together with an associated, unique control word and scale factor.

As mentioned above in connection with the description of the transmit page routine shown in FIGS. 11a, b and c, the conversion of the communication word to engineering notion when entered by the user in binary form, is substantively the same as the signal processing shown and described above in the receive interrupt service routine of FIG. 16.

The receive-all interrupt service routine, generally shown in FIG. 9, and depicted in greater detail in FIG. 17, is initiated by one of the prioritized interrupt signals generated by the receive interface circuit 52 when any word is received while the unit is in the receive-all page mode. As indicated by FIG. 17, the receive-all interrupt causes the signal processing to go to a receive-all interrupt workspace within the microcomputer memory, and to move the received word or words to such workspace for processing by the receive-all interrupt service routine stored in an associated memory workspace. The received binary label is then converted to the three-digit octal label and then into ASCII characters, and moved to a memory of CRT controller 46. Once an octal label has been thusly stored in the CRT memory, and available thereat for presentation on CRT display screen 14, that particular label is masked out so as to not be redundantly displayed on the CRT. The receive-all interrupt service routine has now been completed and the program is returned from this interrupt to the background routines generally depicted in FIG. 9.

Figure 18:
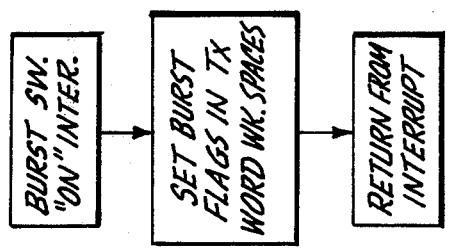
FIG. 18 is a detailed flow diagram of a burst interrupt service routine shown generally in FIG. 9.
Figure 14:
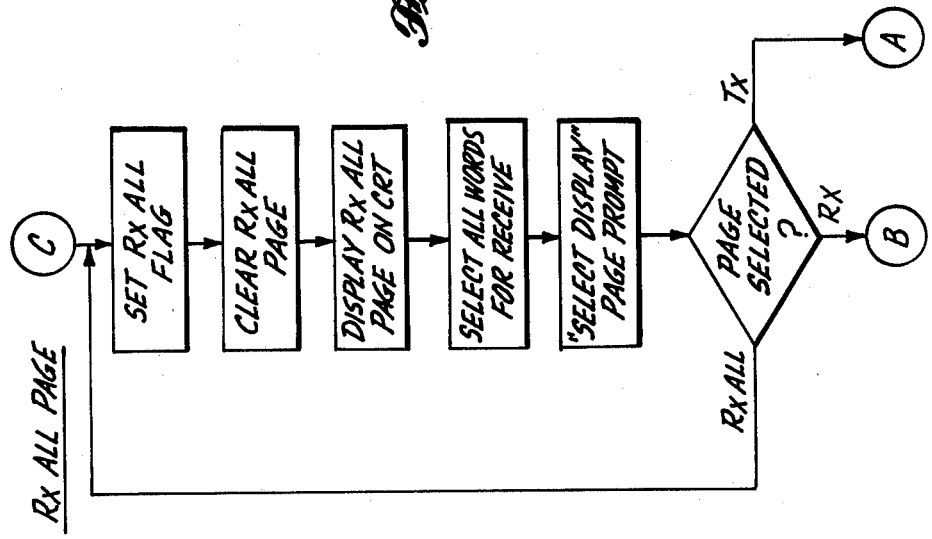
FIG. 14 is a detailed flow diagram of a receive-all page shown generally in FIG. 9.

The final interrupt routine is shown in FIG. 18 as the burst interrupt. The burst interrupt is triggered by a user command in which the burst start switch 28 is operated on control panel 11a (FIG. 1). Responsively, the program is vectored to a predetermined workspace within the microcomputer memory, and a program stored therewithin sets the burst flags in the transmit word workspaces as required by the transmit interrupt service routine shown in FIG. 15. Having set the burst flags, the burst interrupt service routine is complete and the program returns to the background routine shown in FIG. 9.

While only a particular embodiment has been disclosed herein, it will be readily apparent to persons skilled in the art that numerous changes and modifications can be made thereto including the use of equivalent means and devices without departing from the spirit of the invention.

The embodiments of the invention in which an exclusive property or privilege is claimed are defined as follows:

1. A test apparatus for testing systems that communicate by transmission and/or reception of transmit and/or receive words, respectively, in which such words are organized in a predetermined multiple bit format, comprising:
   computer means including a memory;
   data entry means for entering into the memory of said computer means the content of a first multi-bit transmit word in either engineering notation or in binary encoded notation;
   said computer means further including engineering to binary conversion processing means for accepting and converting the content of a transmit word in said memory when entered in said engineering notation, into said binary encoded notation;
   a first transmit port;
   transmit circuit means responsive to said computer means for formatting and transmitting said first transmit word in binary notation from said first transmit port;
   receiving circuit means for receiving a multiple bit receive word in binary notation, said receiving circuit means including means responsive to said computer means for receiving and storing said receive word in binary notation in said memory of said computer means;

said computer means further having binary to engineering conversion processing means for converting the context of said first transmit word to engineering notation when entered into said memory in binary notation, and for converting the receive word, as received in binary notation, to engineering notation;

a display device responsive to display control signals for displaying alphanumeric symbols; and, said computer means including a first display control processing means for generating display control signals that cause said display device to concurrently display the contents of the first transmit word both in engineering and binary notations, and said computer means including a second display control processing means for generating display control signals that cause said display device to concurrently display the contents of the received word both in binary and engineering notations.

2. The test apparatus of claim 1, wherein said predetermined format of said notation of the receive word includes a first field of bits representing a label identifying the nature of the word, and at least one other field of bits representing engineering data, and wherein said receiving circuit means comprises means responsive to entry by said data entry means of said label for a selected receive word to receive and store in said memory of said computer only that receive word having said selected label.

3. The test apparatus of claim 1, wherein the predetermined format of the multi-bit word in binary notation includes a first field of bits representing a label identifying such word, and at least another field of bits representing engineering data, and wherein said computer means further comprises:

a receive-all processing means responsive to said receiving circuit means for receiving a plurality of multi-bit receive words and storing in said memory and first fields of bit representing the labels of such words;

label conversion processing means for converting said first field of bits of each receive word into engineering notation; and, third display control processing means for generating display control signals that cause said display device to concurrently display the labels of said plurality of receive words.

4. The test apparatus of claim 1, wherein said transmit circuit means comprises means for successively transmitting said first transmit word automatically in succession a preselected number of times, so as to cause a burst of transmit words of the same content to be generated and transmitted.

5. The test apparatus of claim 1, wherein said data entry means includes means for entering into the memory of said computer means the content of a second multi-bit transmit word in either decoded engineering notation or in binary encoded notation; and, a second transmit port, said transmit circuit means being responsive to said computer means to transmit said second transmit word from said second transmit port.

6. The test apparatus of claim 5, wherein said computer means and said transmit circuit means include means for concurrent transmission of said first and second transmit words.

7. The test apparatus of claim 6, wherein said computer means and said transmit circuit means further comprise:

transmission rate selection and control means for selectively and independently setting the rates of transmission of said first and second transmit words.

8. The test apparatus of claim 7, wherein said transmission rate selection and control means comprise means for setting the bit speed of transmission and means for setting the word rate of transmission.

* * * * *